United States Patent [19]

Steiner

[11] Patent Number: 5,640,752
[45] Date of Patent: Jun. 24, 1997

[54] CONTROLLED ADJUSTABLE MANUFACTURING METHOD FOR VARIABLE LAMINATIONS USED IN ELECTRO-MAGNETIC INDUCTION DEVICES

[76] Inventor: Robert E. Steiner, 1760 Horseshoe Ridge, Chesterfield, Mo. 63005

[21] Appl. No.: 372,035

[22] Filed: Jan. 12, 1995

Related U.S. Application Data

[63] Continuation-in-part of Ser. No. 129,336, Sep. 30, 1993, and Ser. No. 267,392, Aug. 12, 1994.

[51] Int. Cl.[6] ............................................. H02K 15/02
[52] U.S. Cl. .................... 29/596; 29/564.1; 29/564.6; 29/609; 29/738; 83/50; 83/76.8
[58] Field of Search .......................... 29/596, 598, 605, 29/606, 609, 564.6, 564.1, 738; 242/4 R, 4 B, 4 A, 432.2, 432.3, 432.4; 83/29, 50, 76.6, 76.7, 76.8, 76.9

[56] References Cited

U.S. PATENT DOCUMENTS

| 641,538 | 1/1900 | De B. Pavon . | |
|---|---|---|---|
| 708,220 | 9/1902 | Gill . | |
| 714,891 | 12/1902 | Gill . | |
| 905,817 | 12/1908 | Howell . | |
| 1,952,917 | 3/1934 | Granfield | 29/84 |
| 2,534,312 | 12/1950 | Somerville | 175/356 |
| 2,550,500 | 4/1951 | Schell, Jr. | 175/356 |
| 2,702,375 | 2/1955 | Johnson | 336/210 |
| 2,849,696 | 8/1958 | Moynihan | 336/212 |
| 2,942,511 | 6/1960 | Moynihan | 83/29 |
| 3,360,752 | 12/1967 | Uptegraff, Jr. | 336/59 |
| 3,422,293 | 1/1969 | Booth | 310/16 |
| 3,448,340 | 6/1969 | Lewis | 317/14 |
| 3,458,928 | 8/1969 | Crawford et al. | 29/605 |
| 3,613,229 | 10/1971 | Olsen et al. | 29/605 |
| 3,721,400 | 3/1973 | Weissman | 242/118 |
| 3,750,070 | 7/1973 | Rissinger | 336/84 |
| 3,792,399 | 2/1974 | McLyman | 336/210 |
| 3,810,058 | 5/1974 | White et al. | 336/196 |
| 3,956,651 | 5/1976 | Brammerlo | 310/218 |
| 3,983,433 | 9/1976 | Sims | 310/254 |
| 4,321,572 | 3/1982 | Studer et al. | 336/83 |
| 4,557,039 | 12/1985 | Manderson | 29/605 |
| 4,560,970 | 12/1985 | Lenzing | 336/149 |
| 4,600,911 | 7/1986 | Meinert | 336/212 |
| 4,641,119 | 2/1987 | Moore | 335/297 |
| 4,653,178 | 3/1987 | Graul | 29/605 |
| 4,745,675 | 5/1988 | Marks et al. | 29/396 |
| 4,752,999 | 6/1988 | Sills, Jr. | 29/605 |
| 4,763,848 | 8/1988 | Bernhard | 242/1 |
| 4,924,200 | 5/1990 | Kitahara et al. | 336/65 |

FOREIGN PATENT DOCUMENTS

| 72316 | 3/1970 | Germany . |
|---|---|---|
| 196048 | 4/1923 | United Kingdom . |

*Primary Examiner*—Carl E. Hall

[57] ABSTRACT

A controlled adjustable method for forming and stacking laminations that are used in an electro-magnetic device such as a motor or transformer is disclosed. The method steps provide the incremental forming of a predetermined number of laminations from magnetically conductive material with each lamination having at least one coil winding segment of predetermined incrementally varying width. Each coil winding segment is formed by the movement of variable electrically adjustable mechanical forming elements such as punching or stamping dies or laser devices relative to magnetically conductive material. Following formation of the laminations with the aforementioned coil winding segments of predetermined incrementally varying width, the laminations, with the formed coil winding segments, are stacked to provide a combined generally circular outer winding area about which a predetermined length of conductive wire can be positioned, either directly around the winding area by the placement of a bobbin wound with the electrically conductive wire, or the wire can be wound about a split bobbin that is first assembled over the winding area for subsequent winding with the electrically conductive wire. In moving the forming elements relative to the magnetically conductive material, the forming elements can be moved in any direction in any predetermined linear and/or curvilinear path, depending on the laminations produced. As a result, a variety of different types of electro-magnetic induction devices having a reduced amount of material can be produced.

15 Claims, 21 Drawing Sheets

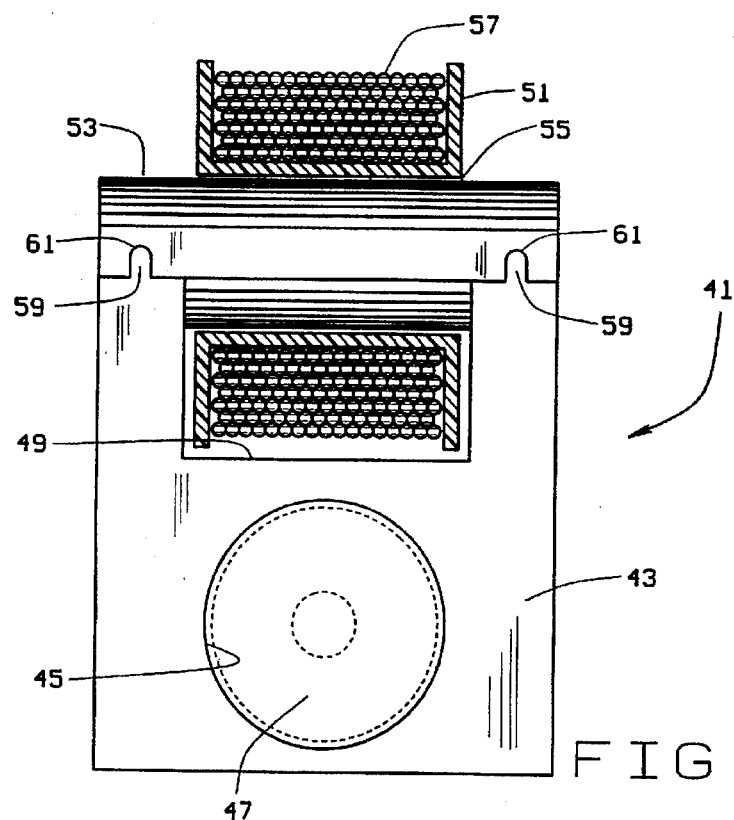
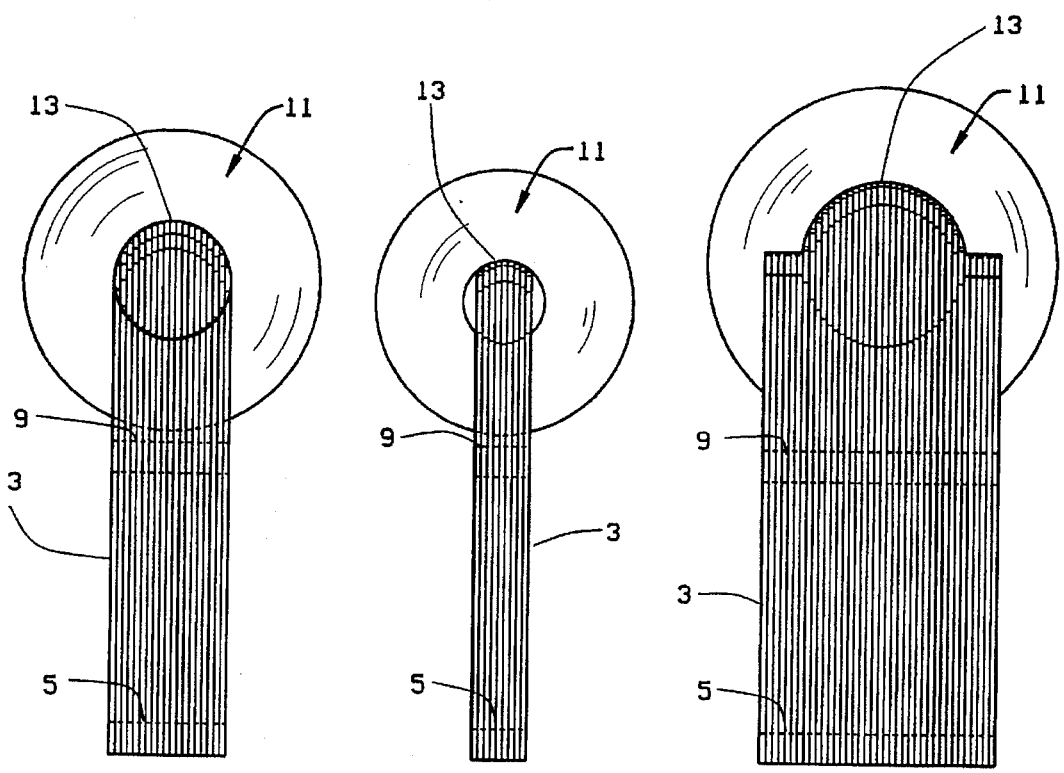
FIG.13A
FIG.13B  FIG.13C  FIG.13D

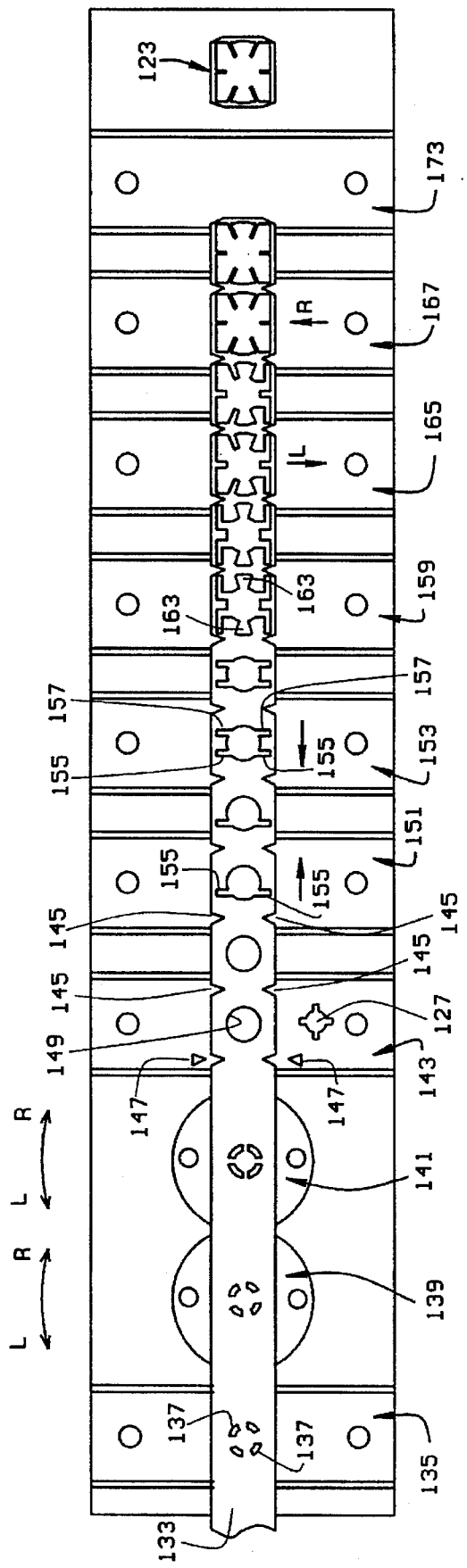

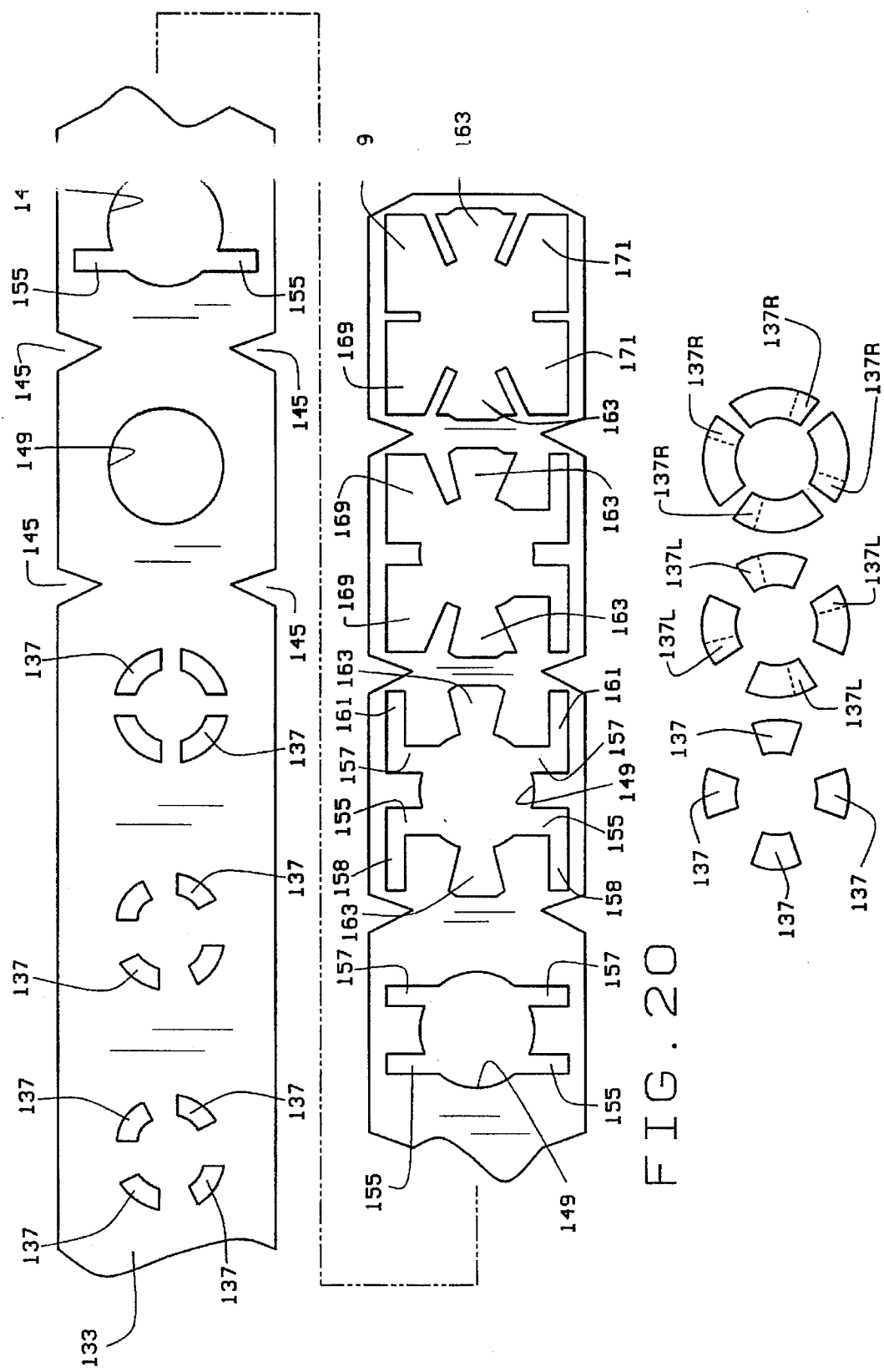

CONTROLLED ADJUSTABLE MANUFACTURING METHOD FOR VARIABLE LAMINATIONS USED IN ELECTRO-MAGNETIC INDUCTION DEVICES

CROSS REFERENCE TO RELATED APPLICATIONS

This application is a continuation-in-part of the following copending patent applications: Ser. No. 08/129,336 filed Sep. 30, 1993 entitled METHOD FOR MANUFACTURING IMPROVED ELECTRO-MAGNETIC INDUCTION DEVICES, and Ser. No. 08/267,392 filed Aug. 12, 1994 entitled MANUFACTURING METHOD AND APPARATUS FOR VARIABLE LAMINATIONS USED IN ELECTRO-MAGNETIC INDUCTION DEVICES.

BACKGROUND OF THE INVENTION

The present invention relates to a controlled adjustable manufacturing method and apparatus for variable laminations used in electro-magnetic induction devices such as motors or transformers, and more particularly, to an improved method and apparatus for variable electrically adjustable mechanical forming of variable laminations which are stacked in a predetermined sequence for use in electro-magnetic induction devices, in order to substantially reduce the amount of material used in the manufacture of such devices.

In my aforementioned copending patent applications, I have disclosed methods and apparatus for selectively forming at least one predetermined area of stacked laminations forming a magnetic inductor circuit with a generally circular outer cross sectional shape at least along opposed spaced sections thereof, in order that an electrically conductive wire can be wound or positioned about such area with substantially less material than is possible with typical square or rectangular cross sectional coil winding areas presently in use. In addition to reducing the amount of electically conductive wire used, the aforementioned generally circular outer cross sectional shape also enables the electrically conductive wire to be layer wound in closely packed relationship in a plurality of superimposed rows, thus providing a close fitting and efficiently wound electrically conductive coil. Thus, not only does the electrically conductive wire, forming the electrically conductive coil, use substantially less material, but in certain instances, the amount of material required for the laminations in the magnetic inductor circuit can also be reduced. As a result, substantial material savings in motors, transformers and other inductive devices can be achieved.

While my aforementioned copending patent applications have disclosed specific details of manufacturing methods and apparatus for forming and stacking laminations constructed as discussed above, it has been discovered that certain improvements in the control and adjustment of such manufacturing methods and apparatus provides improved operating performance with a greater degree of control in the selection, forming and assembly of laminations for use in electro-magnetic induction devices. As will be seen from the discussion that follows, the novel and unique controlled adjustable manufacturing method and apparatus produces precisely controlled variable laminations from magnetically conductive material which are stacked in preferred arrangements for use in electro-magnetic induction devices, in a manner not contemplated by the prior art.

SUMMARY OF THE INVENTION

Among the several objects and advantages of the present invention include:

The provision of a new and improved controlled adjustable manufacturing method and apparatus for variable laminations used in electro-magnetic induction devices;

The provision of the aforementioned new and improved controlled adjustable manufacturing method and apparatus for a variety of different types and kinds of electro-magnetic induction devices, most all of which substantially reduce the amount of material required for the electrically conductive coil used in such devices, and in certain instances, material savings can be achieved in the magnetic inductor circuit and in other components associated with such electro-magnetic induction devices;

The provision of the aforementioned new and improved controlled adjustable manufacturing method and apparatus in which predetermined incrementally varying widths used in coil winding segments are formed by moving forming elements, such as punching or stamping dies, laser, hydro-jet or other cutting devices, relative to magnetically conductive material for incrementally punching the laminations in the desired construction;

The provision of the aforementioned new and improved controlled adjustable manufacturing method and apparatus which provides improved operating performance with a greater degree of control in the selection, forming and assembly of laminations used in electro-magnetic induction devices;

The provision of the aforementioned new and improved controlled adjustable method and apparatus in which simple, efficient and effective variable adjustable forming procedural steps or apparatus are employed for achieving substantial cost reduction in motor and transformer manufacture;

The provision of the aforementioned new and improved controlled adjustable method and apparatus which, in addition, to controlled variable adjustable forming of coil winding laminations which are stacked in a predetermined sequence, can also be counted and staked together, along with stator and rotor laminations, if desired;

The provision of the aforementioned new and improved controlled adjustable manufacturing method and apparatus in which the forming elements can be moved relative to the elongated strip in any direction in predetermined linear and/or curvilinear paths, depending on the laminations desired to be produced;

The provision of the aforementioned new and improved controlled adjustable method and apparatus which is capable of continuous operation and automation in the forming and stacking of the variable laminations; and The provision of the aforementioned new and improved method and apparatus which are readily adaptable to current manufacturing techniques, as well as current electro-magnetic induction device construction, without requiring substantial modifications or changes.

Briefly stated, the controlled adjustable manufacturing method or apparatus for forming and stacking laminations used in an electro-magnetic induction device includes the steps or corresponding structure for incrementally forming a predetermined number of laminations from magnetically conductive material each having a coil winding segment of predetermined incrementally varying width. Each coil winding segment of predetermined incrementally varying width is formed by the variable electrically adjustable movement of mechanical forming elements relative to magnetically conductive material. Subsequently, the laminations are stacked with the coil winding segments of the laminations arranged to form a combined predetermined outer winding area about which a predetermined length of electrically conductive wire can be positioned. The electrically conductive wire can be directly wound on the coil winding area or wound about an associated bobbin that can be positioned about the winding area. Alternatively, split bobbins can be assembled over the winding area and then the electrically conductive coil can be wound about the assembled split bobbins.

For moving the forming elements relative to the magnetically conductive material, a controller such as a computer or program logic controller or other electronically controlled drive means may be employed.

The variable electrically adjustable movement of mechanical forming elements includes independently operating mechanical forming elements that are electrically controlled for variable electrically adjustable synchronized movement relative to one another. Thus, variable adjustable forming of opposite edge portions of at least one coil winding segment in each lamination can take place during the forming of such laminations through independently operating forming elements which are electrically controlled in variable adjustable synchronized movement relative to one another and to an elongated strip of magnetically conductive material.

In the forming of such laminations, the thickness of at least a predetermined length of the elongated strip is measured. This enables the variable electrically adjustable mechanical forming of opposite edge portions of incrementally varying width to be based on the number and thickness of the laminations used in forming a desired electromagnetic induction device. The thickness measurement can be performed prior to the forming of the laminations, during the forming of the laminations or after the forming of the laminations. Where the thickness measurement occurs prior to the forming of laminations, a strip thickness measuring instrument is connected to the controller for the variable electrically adjustable movement of mechanical forming elements corresponding to a predetermined program. Where the thickness measurement occurs during or after the forming of the laminations, the thickness measurement for a stack of rotors or stack of stators of stack of coil winding segments can be fed back to the controller, in an optional feedback measurement system, for the variable electrically adjustable movement of the forming elements corresponding to a predetermined variable program.

An optional staking activator/deactivator may also be connected between the controller and stacking dies associated with the rotor laminations and/or stator laminations and/or coil winding laminations for staking stacks of such laminations, as may be desired.

In performing the controlled adjustable manufacturing method and apparatus of the present invention, the procedure or apparatus employed includes steps or means which select the desired combined predetermined outer winding area for the laminations when stacked, calculating the width of a predetermined winding segment for each lamination and the number of laminations required for the desired combined predetermined outer winding area, forming the laminations based on such calculations, and stacking the laminations in a desired predetermined sequence to form the combined predetermined outer winding area.

The controlled variable manufacturing method and apparatus includes variable adjustment of the width and number of calculations. Such variable adjustment is based, in part, on the incrementally varying widths of the predetermined winding segment of each lamination. Additionally, the variable adjustment is based on the thickness and number of the laminations. Preferably, there is an automatic variable adjustment of the width calculations for each lamination, based on the number of laminations required for the desired shape of each combined predetermined outer winding area and the thickness of the laminations.

In moving the forming elements relative to the magnetically conductive material, the forming elements can be moved in any direction in any predetermined linear and/or curvilinear path relative to the magnetically conductive material, depending on the laminations to be produced. For example, the forming elements can be moved generally transversely relative to the magnetically conductive material or generally longitudinally relative to the magnetically conductive material or moved in predetermined curvilinear including rotary paths relative to the magnetically conductive material. In some instances, a combination of some or all of the above movements are desirable in producing certain types of laminations.

In the formation of certain laminations, such as used in C-frame motors and the like, C-frame laminations are formed from magnetically conductive material. At the same time, coil winding laminations for association with the C-frame laminations are also formed from the magnetically conductive material. During the manufacture of laminations for such C-frame motors and the like, opposite edge portions of the C-frame laminations are formed with predetermined incrementally varying dimensions such that in the forming of predetermined incrementally varying width coil winding laminations, the opposite edge portions are used in forming the coil winding laminations of predetermined incrementally varying widths. The opposite edge portions can be formed by the sequential forming of the C-frame laminations during the progressive forming process. Complementary fastening elements on the C-frame laminations and coil winding laminations are also formed during the forming of the coil winding laminations and C-frame laminations. A U-shaped opening is also formed in the C-frame laminations adjacent the assembled position of the coil winding laminations to the C-frame laminations for receiving the electrical coil positioned about the combined coil winding area of stacked coil winding laminations. The U-shaped opening is formed in the C-shaped laminations either during the forming of the coil winding laminations or after the forming of the coil winding laminations.

In the forming of one type of multi-pole motor, progressively formed predetermined incrementally varying coil winding laminations can be formed from opposite end areas of stator laminations to provide two coil winding laminations each having predetermined incrementally varying width for forming predetermined combined coil winding areas of generally circular outer cross sectional configuration at least along opposed spaced sections thereof for receiving an electrical coil of corresponding shape. Subsequently, the stacked stator laminations and the spaced and stacked coil winding laminations can be assembled to one another.

A multi-pole rotor and stator motor can also be manufactured, where both the rotor and stator laminations are formed with corresponding poles of predetermined construction. The rotor laminations include outwardly directed spaced rotor pole side sections with predetermined incrementally varying width on opposite sides of an outwardly curved rotor pole face section which, when stacked together, form outwardly curved rotor pole faces in associated combined rotor pole side sections of predetermined incrementally varying width. The stator laminations are formed with a plurality of inwardly directed spaced stator pole side sections having predetermined incrementally varying widths on opposite sides of an inwardly curved stator pole face section such that when stacked, they form a combined inwardly curved stator pole face and associated combined stator pole side sections with a combined coil winding area of generally circular outer cross sectional shape at least along opposed spaced sections thereof.

Motors of the multi-pole rotor and stator type can be formed by forming elements moving in predetermined rotary paths, as well as forming elements moving in any direction including any predetermined linear and/or curvilinear path.

In forming certain motors, rotary forming elements that move in predetermined rotary paths relative to magnetically conductive material can also be used in incrementally forming a circumferential series of coil winding areas segments, each coil winding area or segment having predetermined incrementally varying widths similar to other coil winding areas or segments in the circumferential series. The laminations for each of the aforementioned coil winding areas or segments form a predetermined combined outer winding area about which a predetermined length of electrically conductive wire can be positioned.

A variety of other and different types of motors, transformers and other induction devices, some of which are specifically illustrated, can be formed by the controlled adjustable manufacturing method and apparatus of the present invention.

These and other objects and advantages of the present invention will become apparent from the discussion that follows.

BRIEF DESCRIPTION OF THE DRAWINGS

In the drawings.

FIG. 13A is a side elevational view of a modified C-frame motor construction generally similar to the C-frame motor shown in FIG. 10A of the drawing, except with respect to certain horsepower sizes shown in FIGS. 13B–13D;

FIG. 13B is an end elevational view of a predetermined number of stacked laminations used in a particular horsepower size of C-frame motor corresponding to that illustrated in FIG. 8B of the drawings;

FIG. 13C is an end elevational view of a smaller stack height C-frame motor construction varying from that shown in 8C of the drawings in that the coil winding area does not have a full circular configuration, but rather has a generally circular configuration at least along opposed space sections thereof as compared to the construction illustrated in FIG. 8C;

FIG. 13D is an end elevational view of a substantially greater stack height C-frame motor similar to that illustrated in FIG. 8D of the drawings;

FIG. 18 is a fragmentary top plan view of a punching or stamping die layout used in forming a multi-pole stator/rotor motor such as shown in FIGS. 22–24 of the drawings;

FIG. 19 is a side elevational view illustrating the various punching or stamping stations used in the die layout illustration of FIG. 18;

FIG. 20 is an enlarged partial fragmentary view of some of the progressive die stations used in the die layout illustrated in FIG. 18 of the drawings;

FIG. 21 is an enlarged top plan view illustrating the use of rotary stamping dies for forming pole side sections used in the rotor pole construction shown in FIG. 22;

Corresponding reference numerals will be used throughout the several figures of the drawings.

DESCRIPTION OF THE PREFERRED EMBODIMENTS

Figure 1:
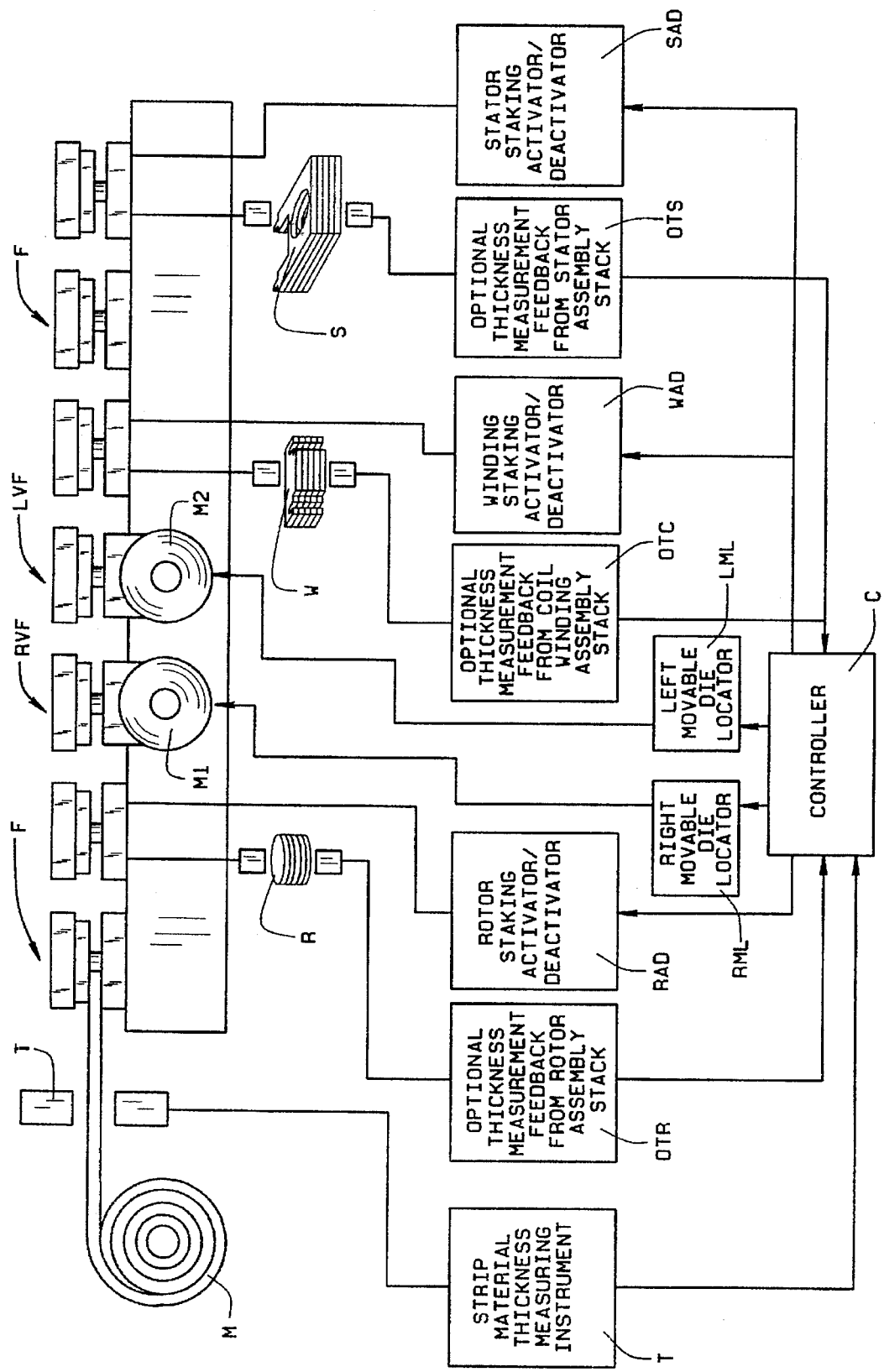
FIG. 1 is a side elevational and schematic view of the controlled adjustable manufacturing method and apparatus illustrating the various method steps and apparatus employed in the present invention.

The following detailed description illustrates the invention by way of example and not by way of limitation. The description will clearly enable one skilled in the art to make and use the invention, and describes several embodiments, adaptions, variations, alternatives and uses of the invention, including what I presently believe is the best mode of carrying out the invention.

In the discussion that follows, it will be understood that the term "magnetically conductive material" includes coil stock in the form of an elongated strip wound in coil form, strip stock in the form of an elongated strip of unwound material or sheet material having predetermined specific widths or lengths as desired; the term "forming element" includes punching or stamping dies as well as laser, hydro-jet or other cutting devices that can be moved in any direction in any predetermined linear and/or curvilinear path relative to the magnetically conductive material; and the term "controller" includes any electrically controlled device such as computer, program logic controller, or other electronically controlled device which provides the variable electrically adjustable movement of the forming elements, as desired.

Before discussing the novel and unique controlled adjustable manufacturing method and apparatus for forming variable laminations from magnetically conductive material so as to enable stacking of such laminations in preferred arrangements for use in electro-magnetic induction devices, it is important to understand the construction and operation of such electro-magnetic induction devices as background context for the present invention.

Electro-magnetic induction devices such as motors, transformers, inductors and the like use an electrically conductive coil or coils wound about or associated with a magnetic inductor circuit of the electro-magnetic induction devices. In a motor, for example, an electrically conductive coil is wound about a winding area to create, through current flowing in the electrically conductive coil, a magnetic field. The magnetic field is induced into the magnetic inductor circuit which includes the poles of the motor. Thus, flux moving between the poles in a magnetic inductor circuit creates a tangential force which is imparted to an associated rotor. Transformers and inductors, on the other hand, have no moving parts; however, energy is transferred from an electrically conductive coil to a magnetic inductor circuit by electro-magnetic induction in a similar manner for developing the desired transformer or inductor action.

As disclosed in my prior aforementioned copending patent applications, by changing the winding area of the poles, for example, to a substantially circular outer cross sectional configuration, at least along opposed spaced areas thereof, several important advantages are achieved. First, a substantially circular outer cross sectional shape provides the cross sectional area with the shortest circumference in the magnetic inductor circuit to wind the electrically conductive wire in forming each electrically conductive coil. Additionally, the aforementioned generally circular outer cross sectional shape also enables the electrically conductive wire to be layer wound in closely packed relationship in a plurality of superimposed rows. This is achieved either by direct winding of an electrically conductive wire on the winding area or through the use of an insulating bobbin which permits the electrically conductive wire to be layer wound in the above described manner to form the electrically conductive coil. As a result, a close fitting and efficiently wound electrically conductive coil can be provided. Not only is there a substantial reduction in the amount of material required for the electrically conductive coil, but in certain instances, the amount of material required for the laminations in the magnetic inductor circuit is also reduced. Moreover, additional savings are capable of being realized in other components such as smaller end bell component savings in motors.

Since each of the winding areas are formed with an incrementally stepped and segmented shape such that when they are stacked in a predetermined arrangement, the combined configuration provides, for example, a generally circular outer cross sectional shape at least along opposed spaced sections thereof, in order to take advantage of all of the features set forth above. It will be understood that a full circular shape and other modified shapes having a smaller outer peripheral shape other than a square or rectangular shape also fall within the definition of a generally circular outer cross sectional or predetermined combined outer cross sectional shape.

The present invention discloses an improved controlled adjustable manufacturing method and apparatus for forming and stacking laminations, constructed as discussed above, for application to a wide range of motors, transformers, inductors and the like, some of which are disclosed in my prior copending patent application. It will be understood; however, that the method and apparatus of the present invention is not limited to specific types or kinds of motors, transformers, inductors or the like; rather, it is intended that the method and apparatus of the present invention be usefully employed for all possible electro-magnetic induction device applications.

Figure 10A:
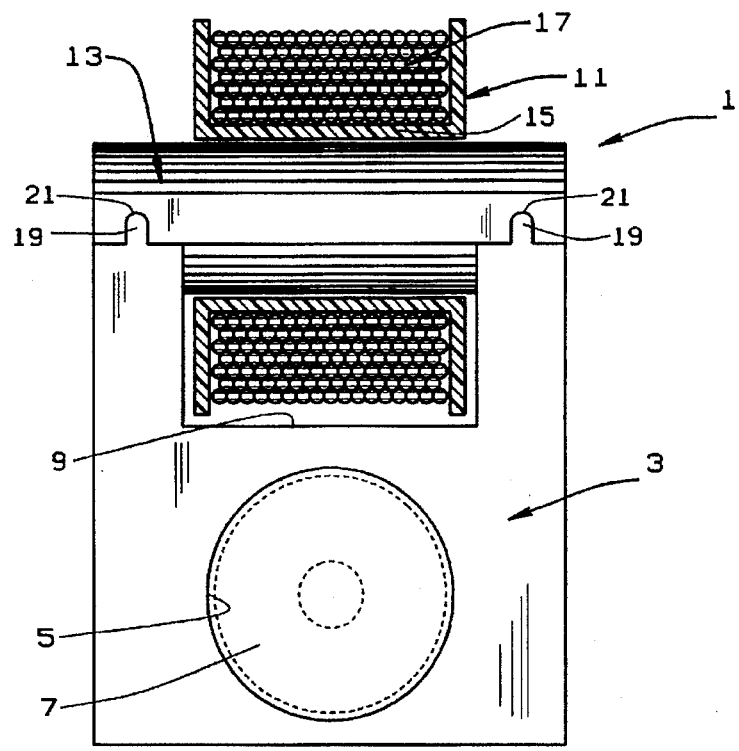
FIG. 10A is a side elevational view of a C-frame motor which includes stacked C-frame laminations and stacked coil winding laminations assembled to one another, after a bobbin wound with an electrically conductive coil is assembled over the stacked C-frame laminations.
Figure 11:
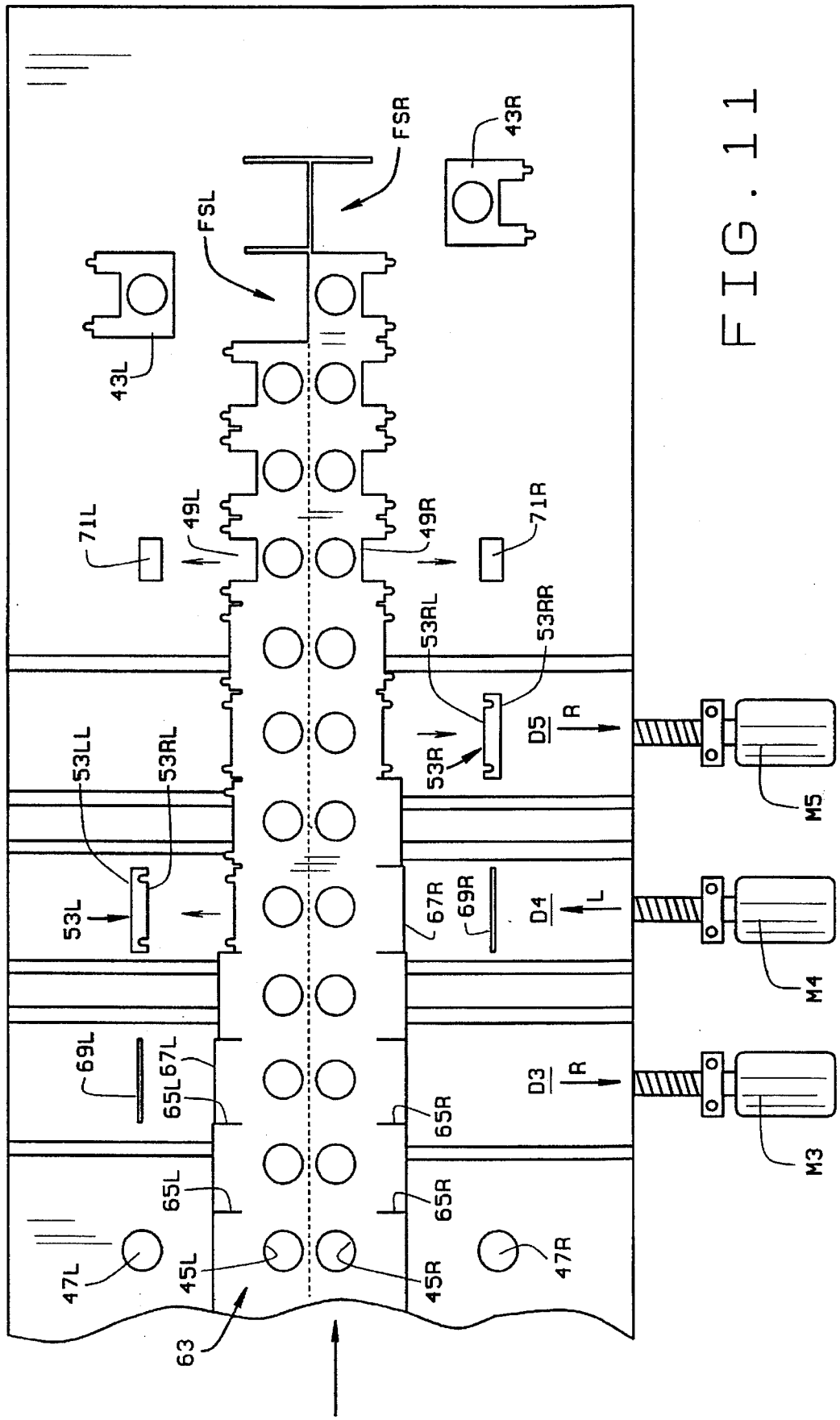
FIG. 11 is a fragmentary top plan view of a modified form of punching or stamping die layout for use in forming the modified C-frame motors illustrated in FIGS. 11A–11D of the drawings.
Figure 12:
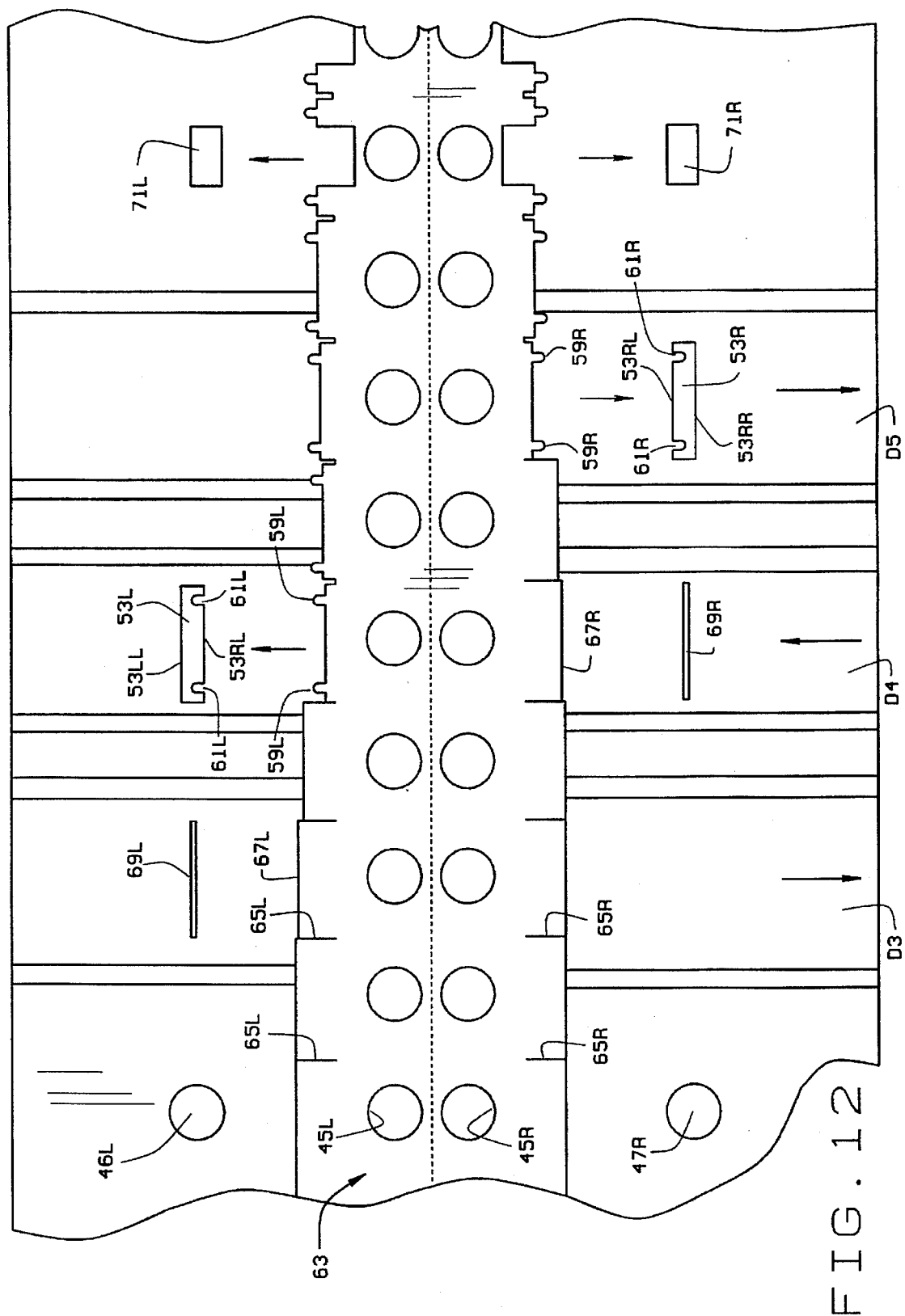
FIG. 12 is a fragmentary top plan view of a further enlarged die layout of FIG. 11.
Figure 14:
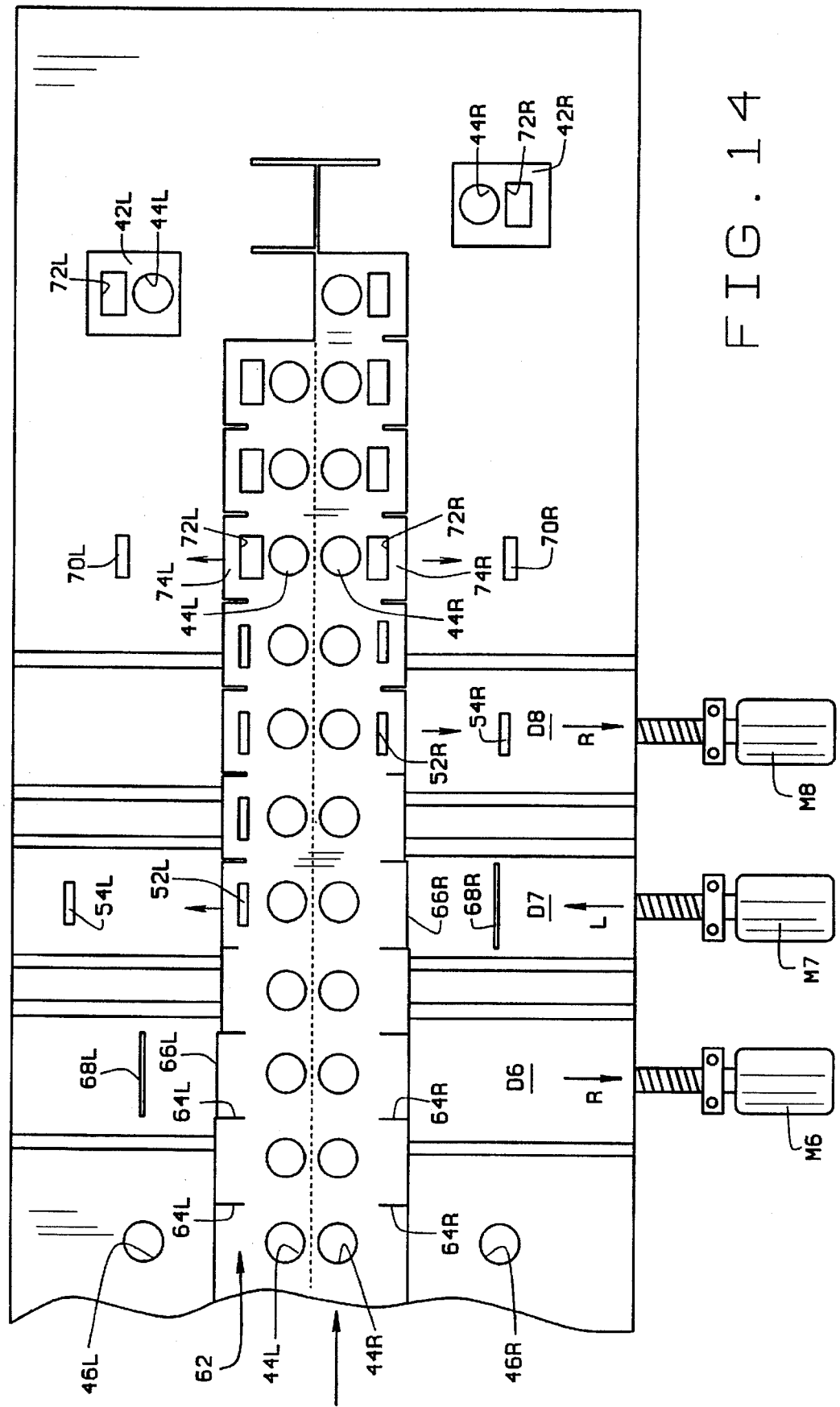
FIG. 14 is a fragmentary top plan view of another punching or stamping layout for use in forming one-piece laminations for C-frame type motors such as those illustrated in FIGS. 13A–13D of the drawings.
Figure 15:
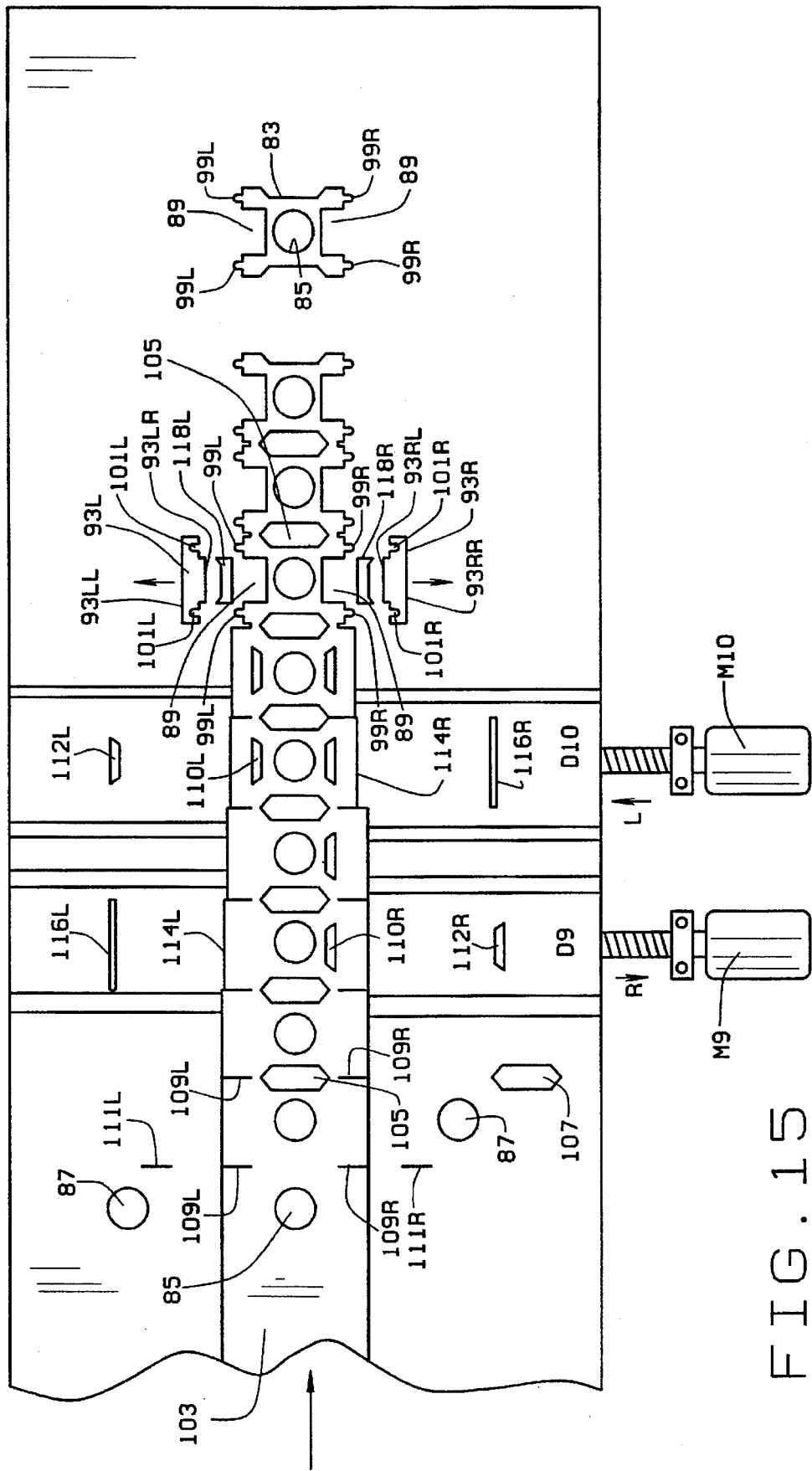
FIG. 15 is a fragmentary top plan view of a punching or stamping die layout for use in forming stacked stator laminations and stacked coil winding laminations in a four pole motor construction such as that shown in FIGS. 16–17 of the drawings.
Figure 25:
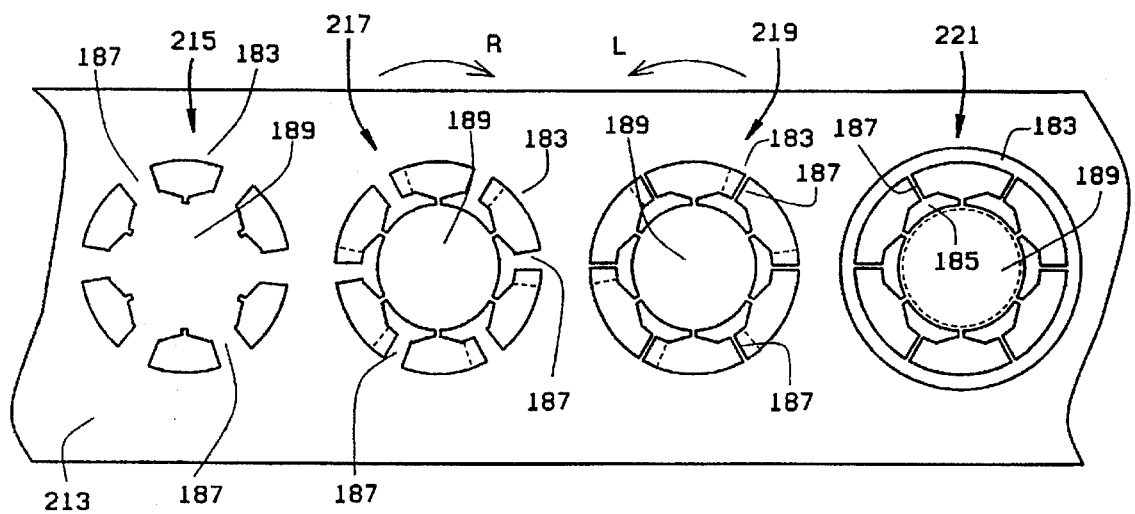
FIG. 25 is a fragmentary top plan view illustrating a rotary stamping die layout used in constructing the winding areas of the stator poles illustrated in the FIG. 26 construction.
Figure 27:
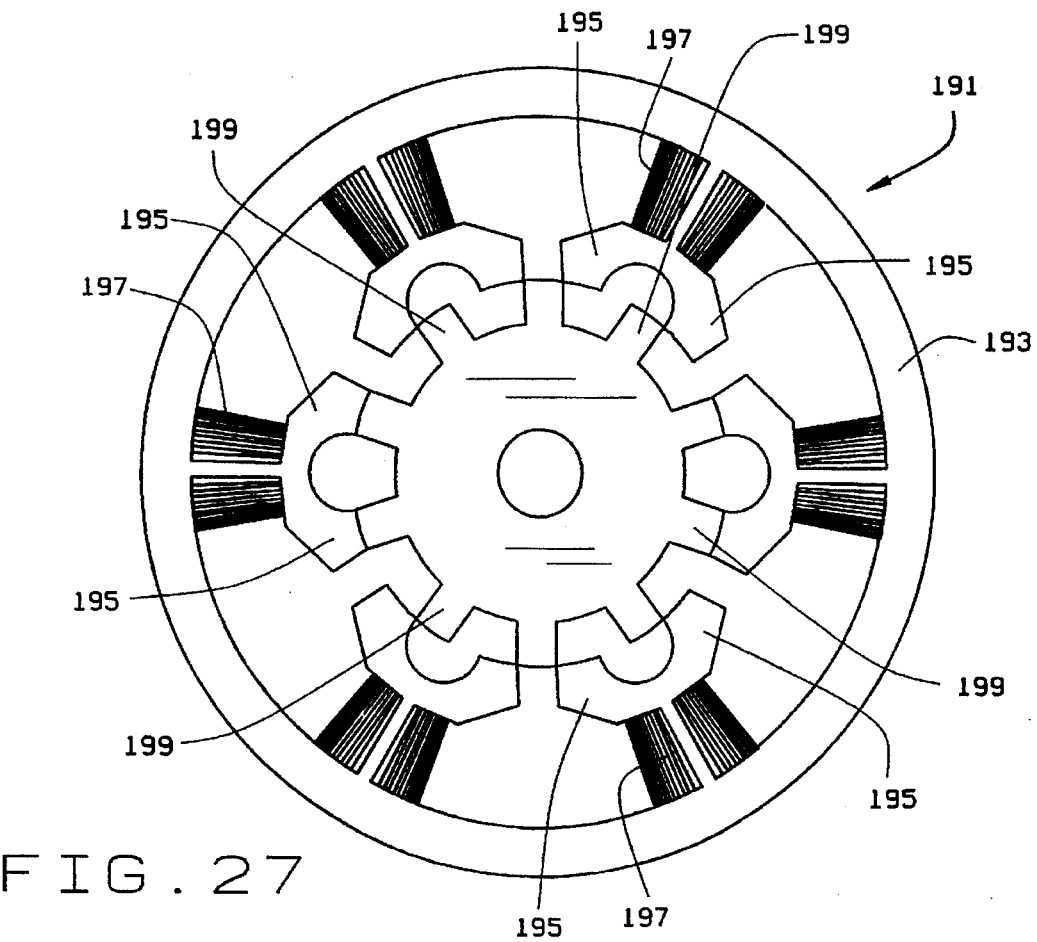
FIG. 27 is a side elevational view of generally circular coil winding segments similar to FIG. 26, but including 12 stator and 10 rotor poles in a variable reluctance motor construction.
Figure 28:
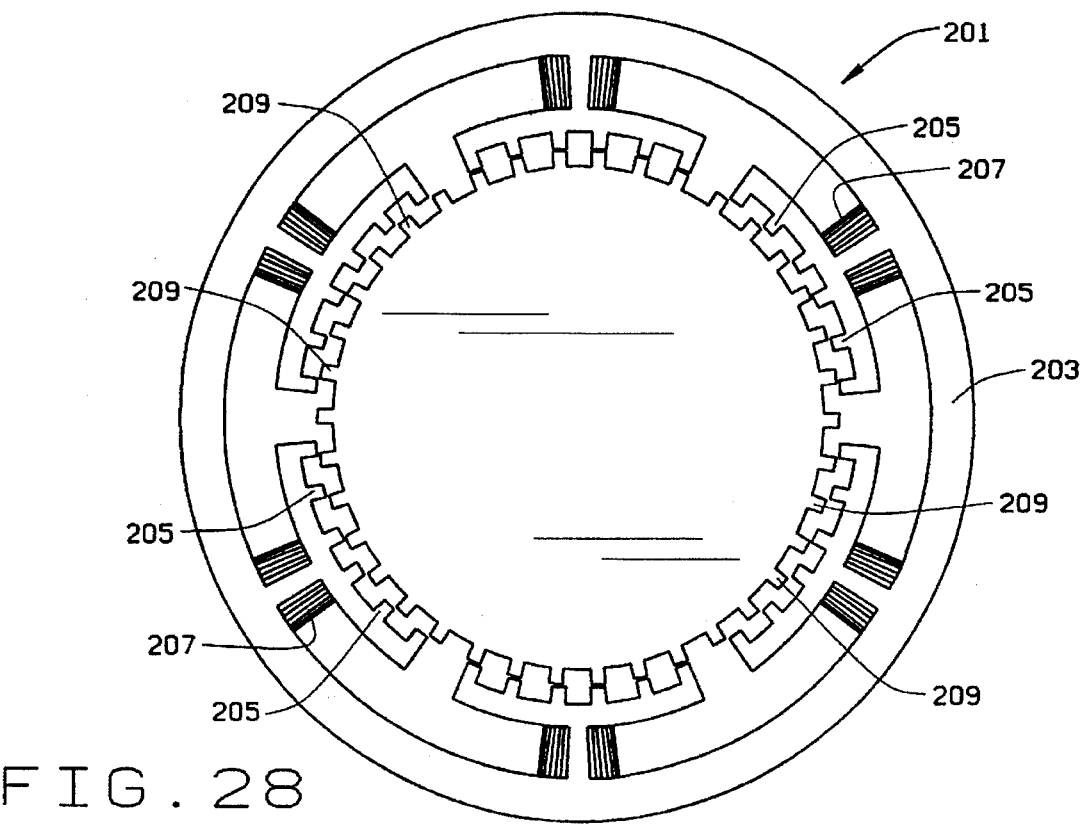
FIG. 28 is a side elevational view of generally circular coil winding segments similar to FIG. 26 in a variable reluctance motor construction having 36 stator poles and 38 rotor poles.
Figure 29:
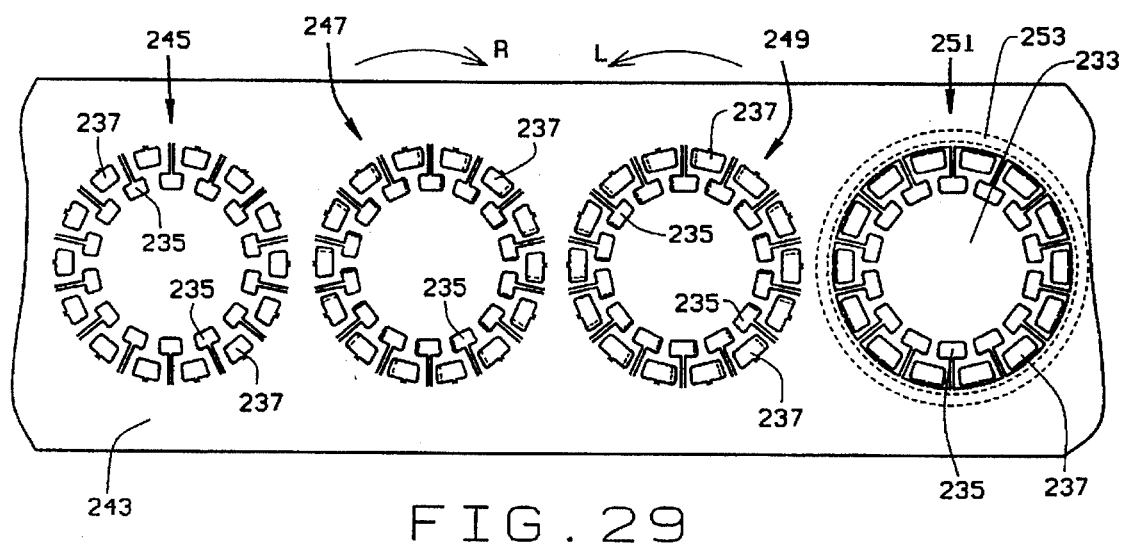
FIG. 29 is an enlarged fragmentary rotary stamping die layout illustrating several of the progressive stamping stations used in forming the inside-out stator construction shown in FIG. 30 of the drawings.

The present invention specifically discloses the controlled adjustable manufacturing method and apparatus of the present invention for use in the following different applications: FIGS. 3–9 disclose a method and apparatus for forming variable laminations for use in a wide range of C-frame horsepower sizes shown in FIGS. 10A–10D; FIGS. 11–12 also disclose a method and apparatus for forming C-frame and coil winding laminations for a similar but slightly different C-frame motor shown in FIGS. 13A–13D; FIG. 14 discloses a method and apparatus for forming one winding area C-frame laminations for forming a motor similar to that drawn in FIGS. 13A—13D of the drawings; FIG. 15 illustrates the method and apparatus for making stacked laminations and coil winding laminations for use in a four pole motor shown in FIGS. 16–17; FIGS. 18–20 disclose the method and apparatus for forming a variable reluctance motor of the type illustrated in FIGS. 22–24; FIG. 25 discloses a method and apparatus for forming a six pole motor shown in FIGS. 26; FIGS. 27–28 show variable reluctance motors manufactured by the method illustrated in FIG. 25; FIG. 29 discloses a method for forming an inside-out motor illustrated in FIGS. 20 and FIGS. 31–36 illustrate other various types of motor designs that can be manufactured by the method and apparatus of the present invention. Each of the methods and apparatus and related motors discussed above will be described in detail below.

Figure 2:
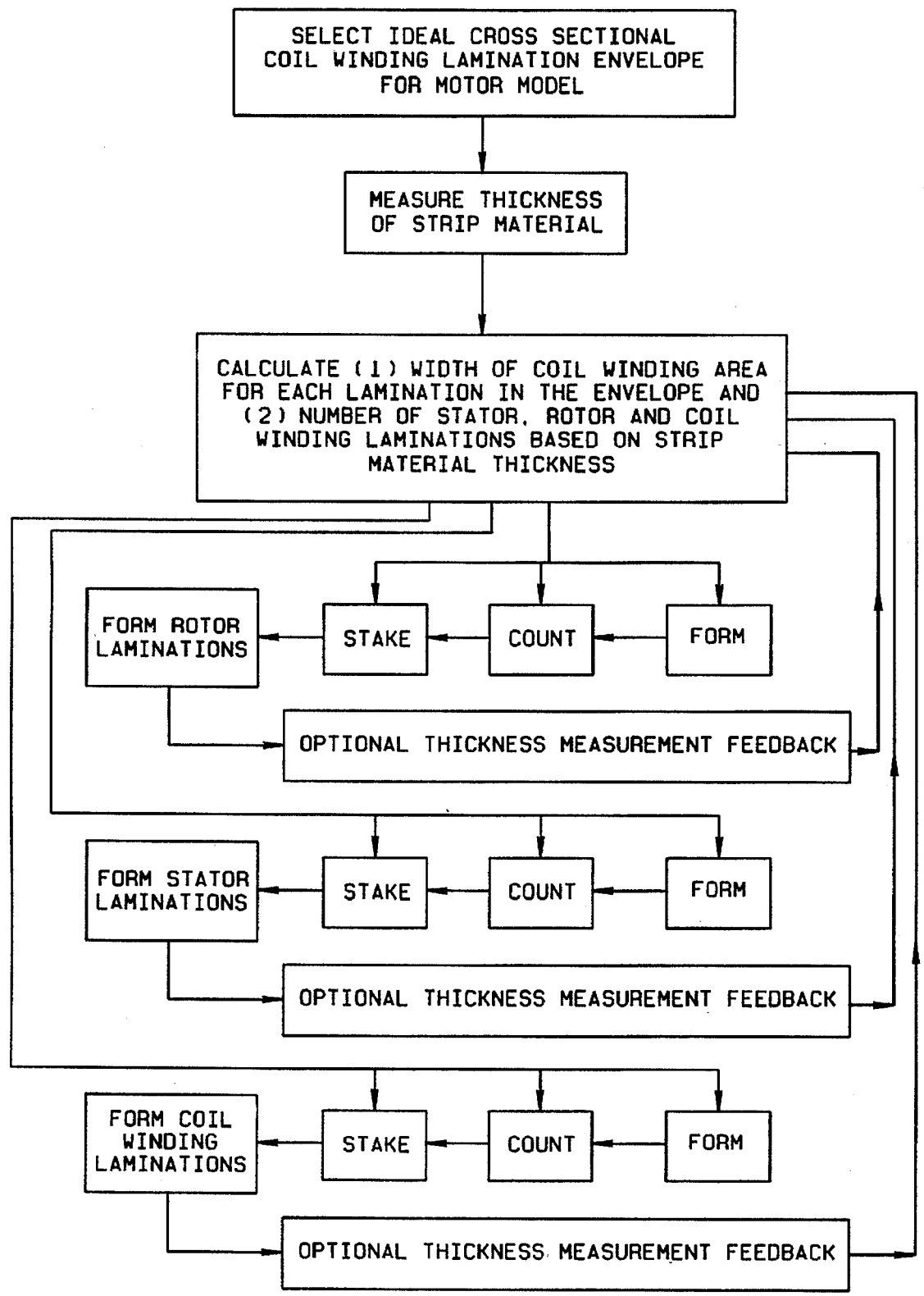
FIG. 2 is a chart illustration of the method steps and apparatus employed in carrying out the principles of the controlled adjustable manufacturing method and apparatus of the present invention.
Figure 3:
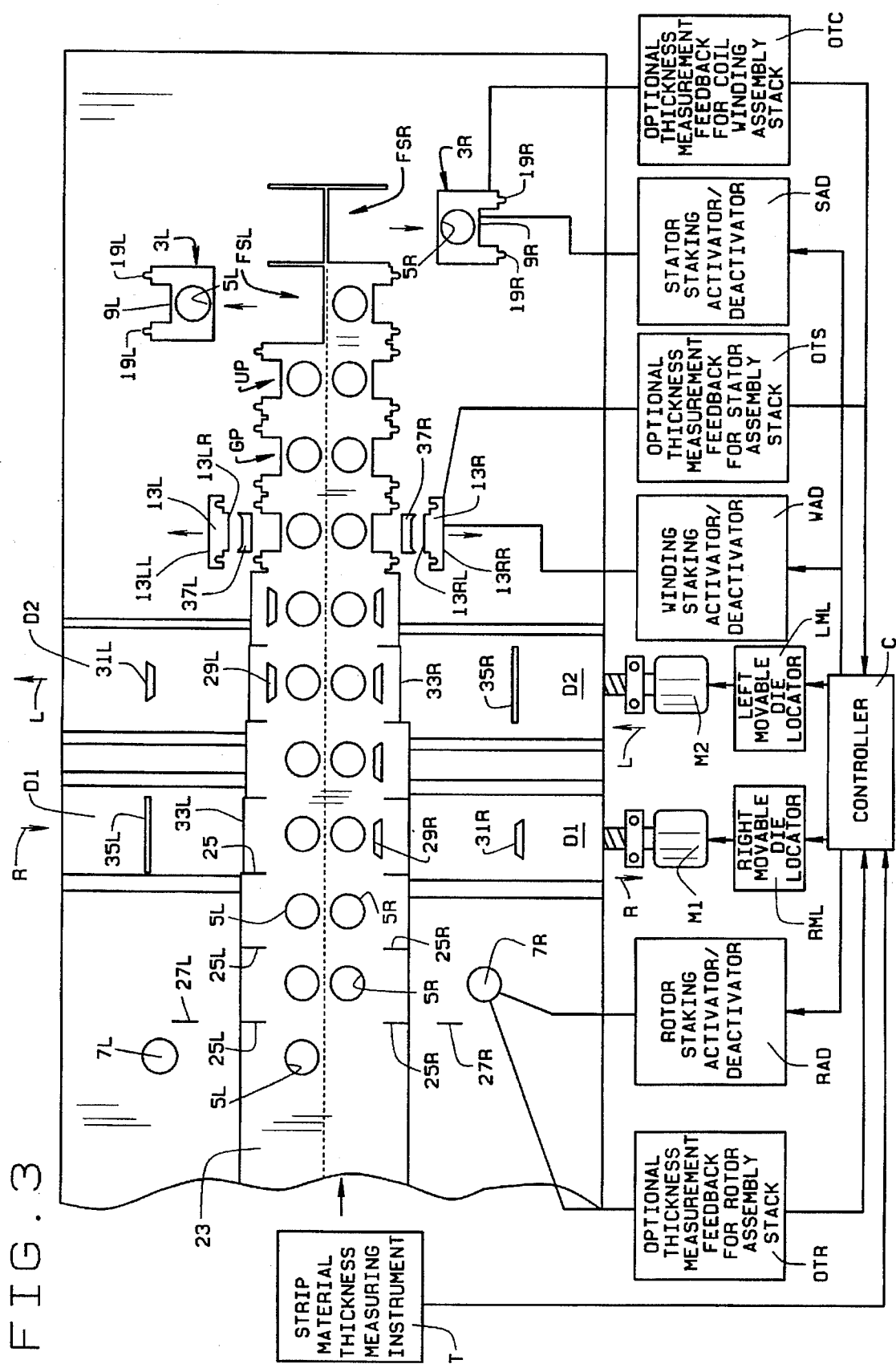
FIG. 3 is a top plan view of a punching or stamping die layout used in the manufacture of laminations for C-frame motors of the type illustrated in FIGS. 10A–10D of the drawings.

Before discussing the specific applications of the controlled adjustable manufacturing method and apparatus of the present invention in the specific applications illustrated in FIGS. 3–37 of the drawings, attention is first directed to FIGS. 1–3 of the drawings for a general description of the controlled adjustable manufacturing method and apparatus of the present invention.

As illustrated in FIG. 1 of the drawings, an elongated strip of magnetic conductive material M is illustrated as being progressively fed, by any well-known feeding mechanism (not shown), through various stages or stations forming a progressive punching or stamping system. These stages or stations in the controlled adjustable manufacturing method and apparatus illustrated in FIG. 1 include a series of forming elements F which are used for forming the rotors R and the stator laminations S that are illustrated in FIG. 1 of the drawings as being arranged in stacked relationship. For forming the variable winding laminations W, a series of variable forming elements including a right variable forming element RVF and a left variable forming element LVF are used in forming the right and left sides of each of the segmented or stepped winding elements W as will be explained in further detail below. The winding laminations W are also shown in stacked relationship in FIG. 1 of the drawings.

The FIG. 1 illustration shows rotor laminations R, stator laminations S and winding laminations W representative of the C-frame motor method and apparatus illustrated in FIGS. 3–9 of the drawings and the resulting C-frame motors shown in FIGS. 10A–10D. It will be appreciated that other and different types of rotor laminations, stator laminations and winding laminations may be formed as will also be apparent in reference to other disclosed motors and transformers of the present invention.

The forming elements F and the right and left variable forming elements RVF and LVF are shown in FIG. 1 of the drawings as comprising punching or stamping dies; however, it will be understood that other types of forming elements such as laser, hydro-jet or other curing devices may be employed in lieu of punching or stamping dies.

In the controlled adjustable manufacturing method and apparatus of the present invention, the rotor laminations R are initially blanked from the elongated strip of magnetically conducted material M and then collected in stacked relationship, as illustrated in FIG. 1. As the manufacturing process continues, various other forming elements F act on the elongated strip of magnetically conductive material M operate to form the stator laminations S; however, the right and left variable forming elements RVF and LVF also operate on opposite sides of the strip M in forming the variable laminations W shown in stacked condition in FIG. 1. Subsequently, a cutoff die or forming element F blanks the stator laminations S from the remaining portions of the elongated strip M for stacking in the manner illustrated in FIG. 1.

It will be appreciated that prior art technology readily disclose a variety of different techniques for feeding as well as punching or stamping the rotors R, winding laminations W and stator laminations S from the elongated strip of magnetically conductive material M. What is not taught by the prior art is the operation of the right and left variable forming elements RVF and LVF, respectively, in the method and apparatus of the present invention.

As has been discussed above, it is desirable to form the stacked winding laminations W with a predetermined combined outer cross sectional shape that will produce a substantial reduction in the amount of material required for an electrically conductive coil positioned about the stacked winding laminations W, and in certain instances, also reduce the amount of material required for the stacked winding laminations W and stacked stator laminations S in the magnetic inductor circuit. Preferably, the predetermined combined outer cross sectional shape has a generally circular outer cross sectional configuration at least along opposed spaced sections thereof. This results in an incrementally stepped and segmented shape for the stacked winding laminations W as the result of the incrementally varying width in adjacent winding laminations W.

In order to produce the incrementally varying width in adjacent winding laminations W for the combined predetermined outer winding area in the stacked winding laminations W, the right and left variable forming elements RVF and LVF, respectively, are utilized. Essentially, the right and left variable forming elements RVF and LVF, respectively, comprise right and left variable movable trim dies which will trim the edges of the winding laminations W in order to produce incrementally varying width adjacent laminations in the stack of winding laminations W.

According to the present invention, this is accomplished through the use of variable electrically synchronized adjustable movement of the mechanically independent forming elements RVF and LVF operating relative to the elongated strip of magnetically conductive material M. In order to have improved operating performance with a greater degree of control in the selection, forming and assembly of the winding laminations W as well as the stator laminations S, it has been discovered that the use of an electrical controller in conjunction with the mechanically independent forming elements RVL and LVF will produce the improved operating performance that is desired in a high speed continuous manufacturing method and apparatus.

As illustrated in FIGS. 1–3 of the drawings, the controller C operates the right movable die locator RML and the left movable die locator LML for operating the electrical drive motors M1 and M2 in order to provide precisely controlled movement of the right and left variable forming elements RVF and LVF that form the winding laminations W. For a more detailed description of how the controller C operates the right and left movable die locators RML and LML, respectively, in moving the motors M1 and M2, respectively, in the manufacture of the C-frame motors illustrated in FIGS. 10A–10D of the drawings, reference is specifically made to the discussion below that describes such operation in connection with FIGS. 3–9 of the drawings.

For purposes of the FIGS. 1–3 general overall description, it will be understood that the controller C may be suitably programmed to produce the desired width of the coil winding area for each lamination that results in the combined predetermined outer coil winding area for a series of stacked coil winding laminations W. In the case of a computer, an algorithm may be developed to provide the desired combined predetermined outer cross sectional winding area shape for a series of stacked laminations W. In this regard, the algorithm may include variables such as the width of the coil winding area for each lamination in the combined predetermined outer winding area and the number of stator, rotor and coil winding laminations in the electro-magnetic induction device, based on strip material thickness. Other variable programs may be incorporated in programmed logic controllers or in other electrically controlled devices.

Regardless of the type of controller C chosen, it is important that the controlled adjustable manufacturing method and apparatus of the present invention provides variable electrically adjustable mechanical forming of opposite edge portions of incrementally varying width for the winding laminations W based on a predetermined cross sectional shape and thickness of a plurality of stacked winding laminations W.

In order to determine the thickness of the elongated strip of magnetically conductive material M, a strip material thickness measuring instrument T may be used prior to the forming operation with the information collected fed to the controller C for use in the algorithm formula or other programmed sequence. In lieu of measuring the thickness of the strip M prior to the forming of the laminations R, W and S, the thickness measurement can take place during or after the forming of such laminations. In this regard, please note in FIG. 1 that there is an optional thickness measurement feedback OTR that can be derived from the rotor assembly stack of rotor laminations R, an optional thickness measurement feedback OTC from the coil winding assembly stack of winding laminations W and/or an optional thickness measurement feedback OTS from the stator assembly stack of stator laminations S. In each case, the optional thickness measurement feedback OTR or OTC or OTS from the stack of rotor laminations R, winding laminations W or stator laminations S can be fed back into the controller for variable adjustment of the right and left variable forming elements RVF and LVF.

The controlled adjustable manufacturing method and apparatus of the present invention also contemplates the counting and staking of the stacked rotor laminations R, winding laminations W and/or stator laminations S, as may be desired. For this purpose, the counting is determined by feeding the thickness into the Controller C for calculating the number of laminations based on the predetermined cross sectional shape or the count can be manually entered into the controller C for determining stack heighth control. For the staking operation, a rotor staking activator/deactivator RAW may be activated or deactivated for the rotor laminations R, a winding staking activator/deactivator WAD may be activated or deactivated for the winding laminations W and a stator staking activator/deactivator SAD may be activated or deactivated for the stator laminations S, as may be desired. Thus, any one or all of the rotor laminations R, winding laminations W and stator laminations S may be staked or non-staked as the same are assembled in stacked relationship to one another in the desired number of laminations, as predetermined or as selected by the controller C.

In order to further appreciate how the variable adjustable mechanical forming sequence operates in conjunction with the forming of stator, rotor and coil winding laminations in the manufacture of an electro-magnetic induction device, reference is made to FIG. 2 of the drawings which further illustrates, in chart form, the controlled adjustable manufacturing method and apparatus of the present invention.

As illustrated in FIG. 2, the initial step in the process is a selection of an ideal cross sectional coil winding laminations "envelope" or coil winding area for a specific motor model. The term "envelope" is intended to mean the combined predetermined outer winding area about which a predetermined length of electrically conductive wire can be positioned, as explained above. Following the selection of the ideal cross sectional coil winding lamination envelope for a particular motor model, the next step in the process is the measuring of the thickness of the strip material. As explained above in connection with FIG. 1, this can be accomplished either prior to the forming operation, during the forming operation or even after the forming operation, as further explained below. Also, this could be manually measured at the start of the process and entered into the controller C. The next step in the process is the calculation of (1) the width of the coil winding area for each lamination in the envelope and (2) the number of stator, rotor and coil winding laminations based on the strip material thickness. As explained above, this can be done by the use of an algorithm in a computer controller in which both the width of the coil winding area for each lamination in the envelope as well as the number of stator, rotor and coil winding laminations that are required, based on strip material thickness, is calculated for use in the forming process.

Subsequently, the forming operation will form rotor lamination R, stator laminations S and coil winding laminations W. As indicated in FIG. 2, the forming process preferably includes the forming, counting and staking of the respective rotor laminations R, stator laminations S and coil winding laminations W. The staking depends, of course, on the activation of the rotor staking activator/deactivator RAD, stator staking activator/deactivator SAD and/or winding staking activator/deactivator WAD, as explained above and in connection with FIG. 1.

As the various laminations are being formed during the forming process, an optional thickness measurement feedback from the rotor laminations R or stator laminations S or winding laminations W is fed back into the controller C for review and/or re-calculation of the (1) width of coil winding area for each lamination in the envelope and (2) number of stator, rotor and coil winding laminations based on the thickness measurement.

Thus, an exactly and accurately formed envelope or coil winding area for a particular motor model can be manufactured, based on the strip material thickness and the number of laminations required. Adjustments can be made at any time either prior to or during the forming process, depending on the tolerances desired.

With the above FIGS. 1–2 background description of the controlled adjustable manufacturing method and apparatus of the present invention, it will be understood that the principles can be incorporated in each of the methods and apparatus disclosed in FIGS. 3–36 of the drawings. This will be apparent from FIG. 3 of the drawing where the features discussed in connection with FIG. 1 are illustrated in a specific application of the controlled adjustable manufacturing method and apparatus of the present invention. The same application of the FIGS. 1–2 disclosure can thus be applied in the other specific methods and apparatus disclosed below.

Reference is now made to the controlled adjustable manufacturing method and apparatus illustrated in FIGS. 3–9 of the drawings for forming the C-frame line of motors illustrated in FIGS. 10A–10D of the drawings. Construction of the C-frame motor 1 illustrated in FIGS. 10A–10D of the drawings includes a predetermined number of stacked stator laminations 3, each of which have a rotor opening 5 at one end for alignment with one another for receiving the rotor 7. The rotor 7 is initially formed from the rotor openings 5 in manufacturing the stator laminations 3. At an opposite end from the rotor opening 5 is a U-shaped opening 9 for receiving a bobbin 11 that is mounted over stacked coil winding laminations 13 which have a generally circular outer cross sectional shape, at least along opposed spaced sections thereof, for reception of the cylindrically shaped center connecting wall 15 of the bobbin 11. This allows an electrically conductive wire 17 to be wound about a cross sectional area with the shortest circumference to reduce the amount of electrically conductive wire required, without sacrificing motor efficiency. The stacked stator laminations 3 each have spaced male bosses 19, 19 for complementary interlocking engagement with complementary shaped female openings 21, 21 formed in the coil winding laminations 13. The complementary spaced male bosses 19, 19 and associated complementary shaped female openings 21, 21 are formed outside of the U-shaped opening so as to avoid any interference with the bobbin 11 and its associated electrically conductive wound wire 17.

Figures 10B, 10C, 10D:
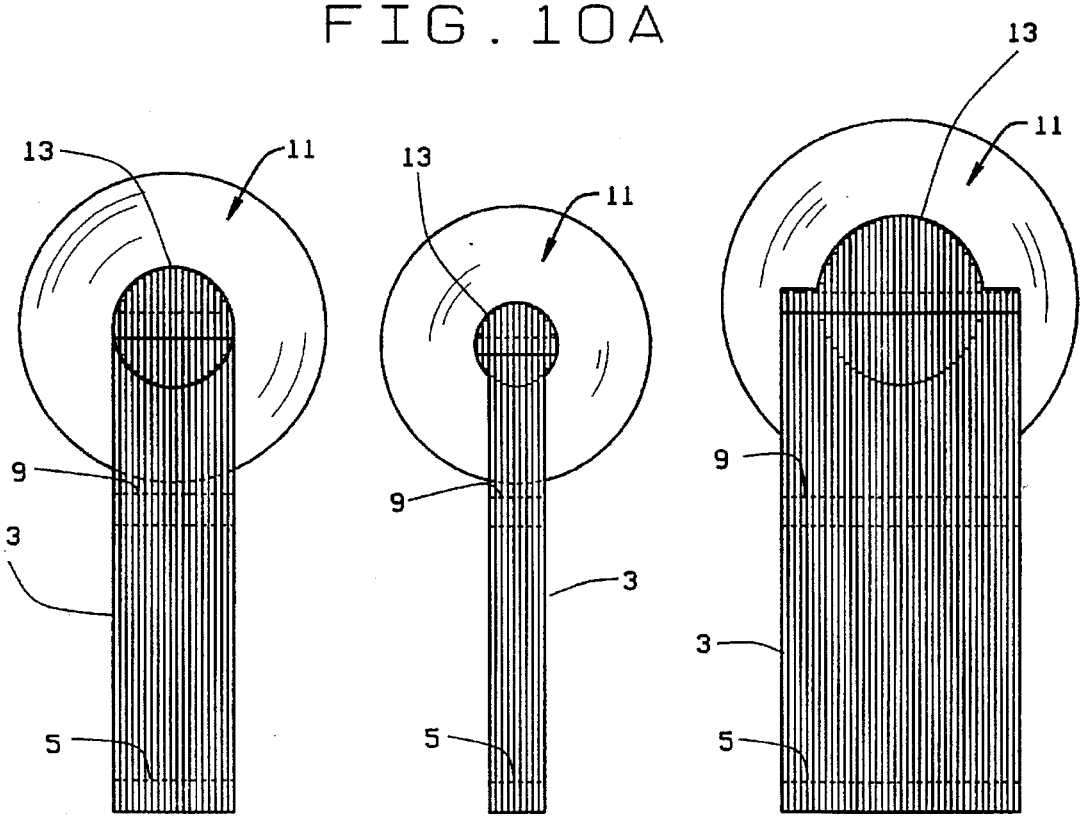
FIG. 10B is an end elevational view of a predetermined number of stacked laminations used in the construction of a particular horsepower size utilizing the C-frame motor construction illustrated in FIG. 8A of the drawings.
FIG. 10C is an end elevational view of a smaller stack height C-frame motor construction.
FIG. 10D is an end elevational view of a substantially greater stack height C-frame motor construction than either the FIG. 8B or 8C C-frame motors.

FIGS. 10B–10D illustrate a line of C-frame motors of different horsepower having the same diameter rotor opening 5 and U-shaped opening 9. FIGS. 10B–10D differ from one another by the use of different stack heights. In FIG. 10B of the drawings, the width of the coil winding area 13 equals that of the stack height, while FIG. 10C shows approximately one-half the size of the stack height illustrated in FIG. 10B with a coil winding area cross section approximately one-half of that illustrated in FIG. 10B. FIGS. 10D illustrates a stack height nearly double that of the stack height shown in FIGS. 10B of the drawings and a coil winding area 13 approximately twice the area illustrated in FIG. 10B. The bobbins 11 also differ in size for each of the motors illustrated in FIGS. 10B–10D.

Attention is now directed to FIGS. 3–9 of the drawings which illustrate the controlled adjustable manufacturing method and apparatus for forming the C-frame stator laminations 3, the rotor laminations 7 and the coil winding laminations 13. As will be seen, an elongated strip of magnetically conductive coil stock 23 is fed from left to right as illustrated by the arrow at the left hand side of FIG. 3. The coil stock 23 is progressively fed, by well-known stock feeding mechanisms (not shown) through various stages or stations forming a progressive punching or stamping system. These stages or stations in the manufacturing method and apparatus are represented by the die layout illustrated in FIGS. 3–5 of the drawings to illustrate how the various punching or stamping stages or stations work on the coil stock 23. It will be understood that additional stages or steps in the actual manufacturing process may be required to produce the specific electro-magnetic induction device desired. It will be further understood that other types of magnetic conductive material can be utilized such as strip stock or sheet material, and other types of forming elements such as laser, hydro-jet or other cutting devices may also be employed in lieu of punching or stamping dies, as discussed above.

Because two mirror image C-frame motor laminations 3 and coil winding laminations 13 are being simultaneously formed in the method and apparatus shown in FIGS. 1–7, a dotted line separates the left and right laminations to facilitate understanding.

As viewed from left to right, the successive series of die cutting steps first includes the forming of a spaced rotor opening 5L within the confines of a left lamination 3L to be formed, as shown by the spaced notches 25L, 25L. As the rotor opening 5L is formed in the coil stock 23 first on the left side and then a corresponding rotor opening 5R is formed on the right side of the coil stock 23, the rotor laminations 7L and 7R will be punched or stamped out from the coil stock 23 for subsequent use in forming the rotor 7 used in the C-frame motor 1 shown in FIG. 10A. Scrap 27L and 27R from each of the spaced notches 25L, 25L and 25R, 25R are also produced, as shown.

Once spaced pairs of rotor openings 5L, 5R are formed in mirror image laminations 3L and 3R, a movable die set D1 moves relative to the coil stock 23, following indexing of the coil stock 23. The movable die set D1 is moved by the controller C which activates the right movable die locator RML that operates the drive motor M1 for moving the movable die set D1 to the right as shown by right arrow R to form a trapezoidal opening 29R in the right lamination 3R to be formed. The right side of the trapezoidal opening 29R forms the left side 13RL of the coil winding lamination 13R. At the same time, the wide notch 33L is formed in the left side of the left lamination 3L which forms the left side 13LL for the left coil winding lamination 13L.

The next movable die section D2 is moved by the controller C which activates the left movable die locator LML that operates the drive motor M2 for moving the movable die set D2 to the left, as shown by the left arrow L, positioning the die set forming the wide notch 35R to be formed in the right side of the right lamination 3R, which forms the right side 13RR of the coil winding lamination 13R. The wide notch 33R produces the scrap notch section 35R to the right side of the coil stock 23, as shown. At the same time, a trapezoidal opening 29L is formed in the left lamination 3L to be formed, the longer side of which forms the right side 13LR of the left coil winding lamination 13L.

The next die station then blanks out the right and left coil winding laminations 13R, 13L, respectively, as well as blanking out the three sides of the U-shaped opening 9L and 9R for the left and right laminations 3L, 3R, respectively. In forming the U-shaped openings 9L and 9R, scrap sections 37L, 37R are also blanked from coil stock at the same time the left and right coil winding lamination 13L and 13R are formed.

Figure 6:
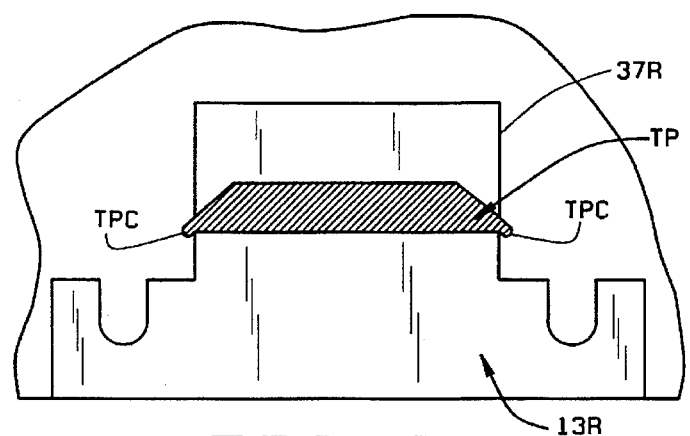
FIG. 6 is a fragmentary top plan view illustrating the forming of a coil winding lamination separate from a C-frame stator lamination as well as the forming of the U-shaped opening in the C-frame stator lamination.
Figure 7:
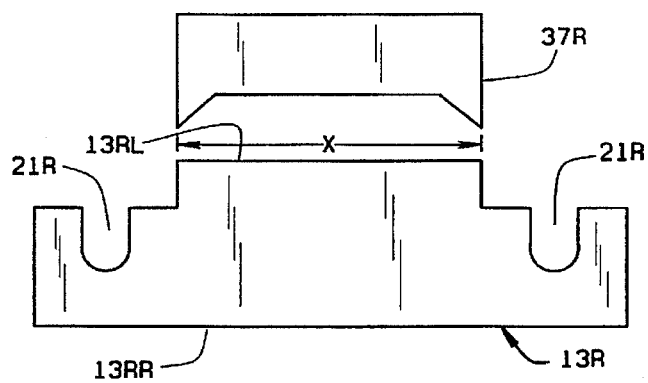
FIG. 7 is a top plan view of the coil winding lamination and separate scrap piece which results from the formation of the coil winding lamination and U-shaped opening in the C-frame stator lamination.

FIGS. 6 and 7 show the purpose of the trapezoidal shaped punch TP that is used for forming the trapezoidal openings 29R, 29L. The trapezoidal shaped punch TP provides a small notched or corner area TPC on opposite sides of the trapezoidal punch TP that forms the spaced notches 39R, 39R and 39L, 39L in the material surrounding the U-shaped openings 9R and 9L, as shown in FIG. 3. The small notches 39R, 39R and 39L, 39L enable the coil winding laminations 13R, 13L and the scrap sections 37R, 37L to cut away separately and cleanly from the coil stock 23. This also assures a line-to-line fit since the width X of the coil winding lamination 13R across the left side 13RL, for example, is essentially the same size as that of the U-shaped opening 9R.

To make the coil winding lamination 13R and the U-shaped opening 9R in the right lamination 3R, the lamination punch is ungaged. To make wider laminations for a taller stack height motor, such is shown in FIGS. 8D, for example, this punch and punch GP are gagged and punch UP is ungagged as illustrated in FIG. 3, while also using proper wider width material. More sizes could be made by adding more gag punches. For example, see the dotted line representation of gag punches in the lower right hand corner of FIG. 5 for use with different material widths. In concluding the stamping operation, the left and right stator lamination 3L and 3R are then stamped out in final stamping stations FSL for the left lamination 3L and FSR for the right lamination 3R.

Figure 8:
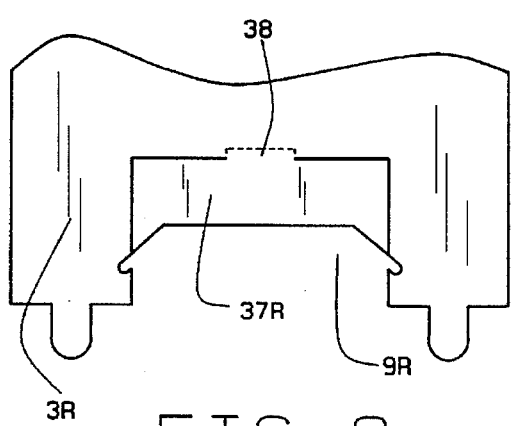
FIG. 8 is a fragmentary top plan view of an alternate sequential method for removing the coil winding lamination and scrap piece from the U-shaped opening in the C-frame motor lamination.
Figure 9:
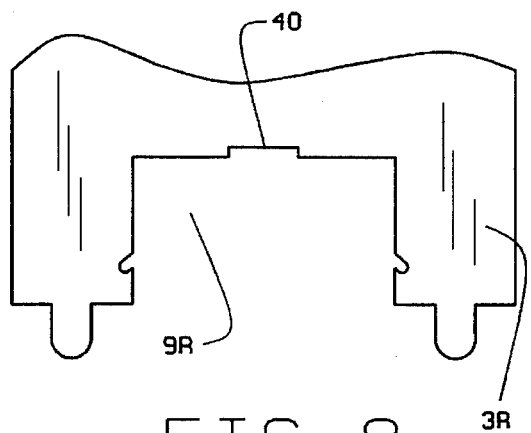
FIG. 9 is a fragmentary top plan view of the alternate sequential method shown in FIG. 8 with the scrap piece removed from the C-frame motor lamination.

An alternate to simultaneous removal of the coil winding lamination 13R, 3L and the scrap sections 37R, 37L is shown in FIGS. 8–9 of the drawings. FIG. 8 shows the scrap section 37R retained in attached position at 38 to the right lamination 3R to be formed, even through the coil winding lamination 13R has already been stamped and separated from the coil stock when the U-shaped opening 9R is simultaneously formed, as described above. At a later die station, the scrap section 37 is removed from the U-shaped opening 9R, as shown in FIG. 9, leaving only a small notched area 40 where the scrap section 37R had been previously attached at 38 to the right lamination 3R to be formed.

Figure 4:
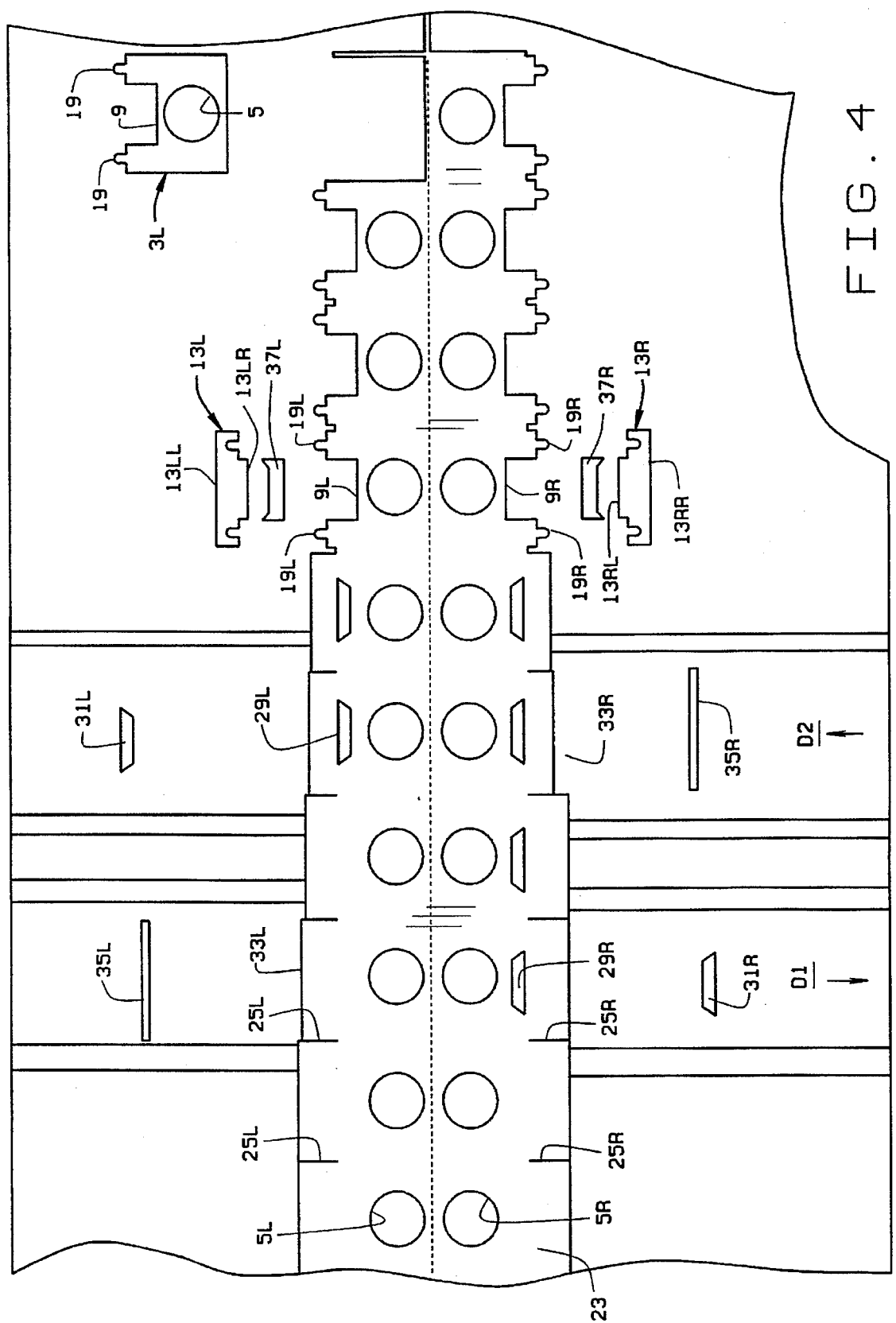
FIG. 4 is a fragmentary top plan view of a further enlarged die layout of FIG. 3.
Figure 5:
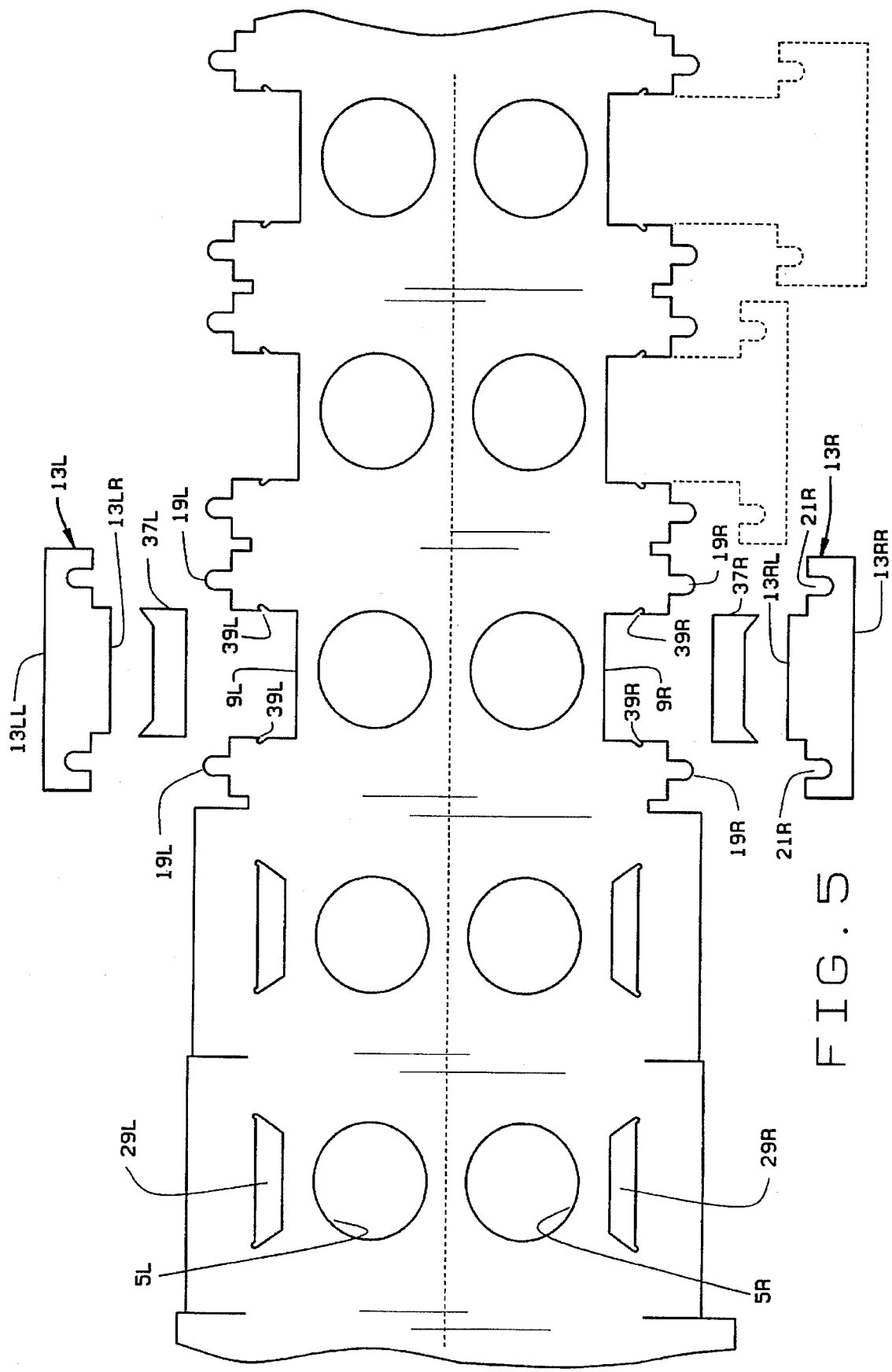
FIG. 5 is a fragmentary top plan view of even a further enlarged die layout of FIG. 4.

As seen in each of FIGS. 3–5, but as best seen in FIGS. 4–5, the width of the combined right and left side laminations 3R, 3L are reduced in width due to the varying amount of material removed as the wide notches 33 R, 33 L are operated by the controller C controlled stepper motors M1 and M2 to move to the desired location for producing stair stepped or incremental differences of predetermined incrementally varying widths. As a result, when a predetermined number of coil winding laminations 13L or 13R are used with a corresponding number of stator laminations 3L or 3R, the coil winding laminations 13L, 13R are arranged to be stacked, by any suitable means, as a predetermined combined coil winding area of generally circular outer cross sectional shape, at least along opposed spaced sections thereof. The manner in which this is accomplished, it will be best understood by the illustration of the coil winding laminations 13R and 13L being stacked to provide the configurations illustrated in FIGS. 10A–10B of the drawings where the combined stacked laminations provide a coil winding area of generally circular outer cross sectional shape at least along opposed spaced sections thereof.

Once the stacked coil winding laminations 13R and 13L are formed in a manner illustrated in FIGS. 10A–10B of the drawings, the insulating bobbin 11 with the electrically conductive coil 17 is mounted over the coil winding laminations 13R and 13L, in each instance, after which the stator laminations 3R or 3L are assembled to the respective coil winding laminations 13R or 13L through the complementary male and female fastener connections 19, 19 and 21, 21, as will be understood.

The C-frame line of motors shown in FIGS. 10A–10D can be changed by simply changing the coil stock width and utilizing a different size bobbin, in certain instances. The die layout shown in FIGS. 3–5 is arranged so that the coil winding area 13 is formed independently from the C-shaped lamination 3. All that is required is that enough of the motors that use less laminations for the winding area laminations 13 than for the stator laminations 3 be made to provide the extra laminations required for the shorter stack motors that use more laminations for the coil winding lamination. This is, in part, illustrated in FIGS. 10B–10D where the widest stack height shown in FIG. 10D is manufactured to provide additional laminations needed for the coil winding areas of the shorter stack height motor shown in FIG. 10C. FIG. 10B shows the crossover point where the number of coil winding laminations 13 are equal to the stator laminations 3.

It will also be noted that in the shorter stack height motor shown in FIG. 10C, the core or coil winding area 13 extends partially beyond the width of the stacked stator laminations 3. This is not the case with the greater stack height motor illustrated in FIG. 10D where the stator laminations 3 actually extend beyond the width of the coil winding laminations 13. However, due to the independent forming of the stator laminations in coil winding laminations, a line of C-frame motors of different horsepower having the same diameter rotor opening can be constructed.

In lieu of punching or stamping dies, one or more laser, hydro-jet or other cutting devices (not shown) can be arranged in a predetermined format for movement in any direction in any linear and/or curvilinear path relative to the coil stock or other magnetic conductive material for forming the stator laminations and coil winding laminations. In such instance, the one or more laser devices serve as forming elements which are moved relative to magnetically conductive material in forming the stator laminations and coil winding laminations. This same technique can also be employed in methods subsequently discussed.

It will also be understood that the other steps and features of the present invention including the measuring of the strip material prior to, during or after the forming operation, in order to provide the desired coil winding area or envelope, are also utilized, as may be desired. This is reflected by the illustration in FIG. 3 of the strip material thickness measuring instrument T prior to the forming operation, as well as the optional thickness measurement feedback from the rotor assembly stack OTR, from the coil winding assembly stack OTC or from the stator assembly stack OTS. As also is illustrated in FIG. 3, the rotor staking RAD or winding staking WAD or stator staking SAD activator/deactivator may also be employed, depending on the desire of staking one or more of such lamination stacks. The controller C is thus usefully employed in controlling all of such aforementioned steps and functions in the controlled adjustable manufacturing method and apparatus of the present invention.

FIGS. 11-12 of the drawings show a modified C-frame motor manufacturing method and apparatus for forming the C-frame motors illustrated in FIGS. 13A-13D of the drawings. The C-frame motors illustrated in FIGS. 13A-13D of the drawings are similar to the motor 1 illustrated in FIGS. 10A-10D of the drawings with the exception that the smaller stack height motor 11C does not have a full circular cross sectional configuration, but rather has a generally circular outer cross sectional shape at least along opposed spaced sections thereof. This is due to the fact that the manufacturing method and apparatus shown in FIGS. 11-12 of the drawings does not produce extra laminations for the winding coil laminations 53, as in the FIGS. 3-9 disclosed method and apparatus.

As in the FIGS. 3-9 method and apparatus, the method and apparatus of FIGS. 11-12 also forms two mirror image C-frame motor laminations and coil winding laminations simultaneously. Thus, a dotted line separates the left and right laminations from each other to assist in understanding the described method and apparatus.

As viewed from left to right in FIGS. 11-12, a successive series of die cutting steps takes place through various stages or stations in a progressive punching or stamping system. While the FIGS. 3-9 method and apparatus disclose two movable die sets D1 and D2 which move relative to the elongated strip 23, the method and apparatus shown in FIGS. 11-12 disclose three movable die sets D3, D4 and D5 each operated by computer or electronically controlled drive motors M3, M4 and M5, respectively.

As viewed from left to right in FIGS. 11-12, the first step in the method and apparatus of FIGS. 11-12 includes the forming of the rotor openings 45L and 45R which produce the stamped rotor laminations 47L, 47R, as illustrated. The spaced rotor openings 45L, 45R are formed within the confines of the spaced notches 65L, 65L for the left lamination 43L and right spaced notches 65R, 65R for the right lamination 43R.

Then, the computer or electronically controlled drive motor M3 operates the movable die set D3 to move it to the right in order to form the wide notch 67L on the left side of the left lamination 43L to produce the scrap piece 69L. The left side of the left lamination 43L forms the left side 53LL for the left coil winding lamination 53L.

The next movable die section D4 is moved by a controller and die locator for operating the drive motor M4 to move the die section D4 to the left, as shown by the left arrow L, positioning the die set forming the wide notch 67R to be formed on the right side of the right lamination 43R, which also forms the right side 53RR of the coil winding lamination 53R subsequently to be formed by the movable die section D5. The wide notch 67R produces the scrap notch section 69R to the right side of the coil stock 63, as shown. At the same time, the left coil winding lamination 53L is formed, along with the complementary male and female fastening connections 59L, 59L and 61L, 61L in the left lamination 43L and winding coil lamination 53L, respectively.

The next movable die section D5 is operated by a controller and die locator for operating the drive motor M5 to move the die section D5 to the right as shown by the right arrow R for forming the right coil winding lamination 53R, in the same manner as left coil winding lamination 53L.

At the next die station, scrap pieces 71R and 71L, to the right and left side of the coil stock, are blanked from the right and left laminations 43R, 43L to form the U-shaped openings 49R, 49L respectively. At final stamping stations FSL and FSR, the left and right stator laminations 43L and 43R, respectively, are stamped from the coil stock 63 to provide the separate laminations.

As seen in both FIGS. 11-12, the width of the combined right and left side laminations 43R, 43L are reduced and increased in width due to the varying amount of material removed as the wide notches 67L, 67R and coil winding laminations 53R, 53L are increased and decreased for producing stair stepped or incremental differences of predetermined incrementally varying widths. This results in a predetermined number of coil winding laminations 43L or 43R for a corresponding number of stator laminations 43L or 43R which are arranged to be stacked as a predetermined combined coil winding area of generally circular outer cross sectional shape, at least along opposed spaced sections thereof. This is best illustrated in the C-frame motor illustrations of FIGS. 13A-13D. The motor shown in FIGS. 13B and D have a generally circular outer cross sectional shape, while the coil winding laminations 53 in the FIG. 13C embodiment has a generally circular outer cross sectional shape, at least along opposed spaced sections thereof.

The method and apparatus shown in FIG. 14 differs from that shown in FIGS. 3-9 and 11-12 in that instead of forming separate C-frame laminations and coil winding laminations which are subsequently assembled to one another after an insulating bobbin with electrically conductive coil is mounted over the stacked coil winding lamination, a one-piece lamination is formed with an integral coil winding lamination. After a series of similarly formed one-piece laminations are stacked, a split insulating bobbin is positioned over the coil winding area and the electrically conductive coil is wound over the assembled split bobbin. This is best explained, for example, in my aforementioned copending patent application Ser. No. 08/129,336 filed Sep. 30, 1993 entitled METHOD FOR MANUFACTURING IMPROVED ELECTROMAGNETIC INDUCTION DEVICES.

The FIG. 14 method forms 2 mirror image one-piece C-frame motor laminations which are separated from one another by the dotted line that extends down the center of the strip 62. The method and apparatus for forming one-piece laminations as shown in FIG. 14 is somewhat similar to the method and apparatus illustrated in FIGS. 11-12 of the drawings. As viewed from left to right in FIG. 14, the first step includes the forming of rotor openings 44L and 44R in the strip 62 which produces the stamped rotor laminations 46L, 46R, as illustrated. The spaced rotor openings 44L and 44R are formed within the confines of spaced notches 64L, 64L and 64R, 64R for the left and right one-piece laminations 42L, 42R, respectively.

A controller and die locator operates the drive motor M6 to move the movable die set D6 to move it to the right, as shown by right arrow R, in order to form the wide notch 66L in the left side of the left lamination 42L to produce the scrap piece 68L.

The next movable die section D7 is moved by the controller and die locator to operate drive motor M7 to move the die section D7 to the left, as shown by left arrow L, to form the wide notch 66R on the right side of the right lamination 42R. The wide notch 66R produces the scrap piece 68R to the right side of the coil stock 62, as shown. At the same time, the rectangular opening 52L is formed in the left lamination 42L. This produces the rectangularly shaped scrap piece 54L to the left side of the coil stock 62.

The next movable die section D8 is moved by the controller and die locator to operate the drive motor M8 to move the die section D8 to the right, as shown by right arrow R, for forming the rectangular opening 52R in the right lamination 42R producing the rectangularly shaped scrap piece 54R to the right of the coil stock 62.

At the next die station, rectangularly shaped scrap pieces 70R and 70L are blanked from the right and left laminations 42R, 42L to form the coil winding window 72R, 72L in the right and left laminations 42R, 42L, respectively.

It will be understood that the width of the integral coil winding are 74R, 74L are reduced and increased in width due to the varying amount of material removed as the wide notches 66R, 66L and rectangular openings 52R, 52L are increased and decreased for producing stair stepped or incrementally varying widths. This results in a predetermined number of stacked laminations for each motor to be formed leaving a predetermined and combined coil winding area of generally circular outer cross sectional edge, at least along opposed spaced sections thereof.

As indicated above, split insulating bobbins will be assembled over each thus formed combined coil winding area in order to enable an electrically conductive wire to be wound about the assembled split bobbin, as described in copending patent application Ser. No. 08/129,336 identified above.

The FIG. 14 method and apparatus thus illustrates the forming of one-piece C-frame motor laminations in lieu of the separate C-frame and coil winding laminations formed by the method and apparatus illustrated in FIGS. 3–9 and 11–12. It will also be understood that similar one-piece laminations can be formed for the four pole motor shown in FIGS. 16–17 of the drawings, as well as for other motors that come within the purview of the present invention.

Figure 16:
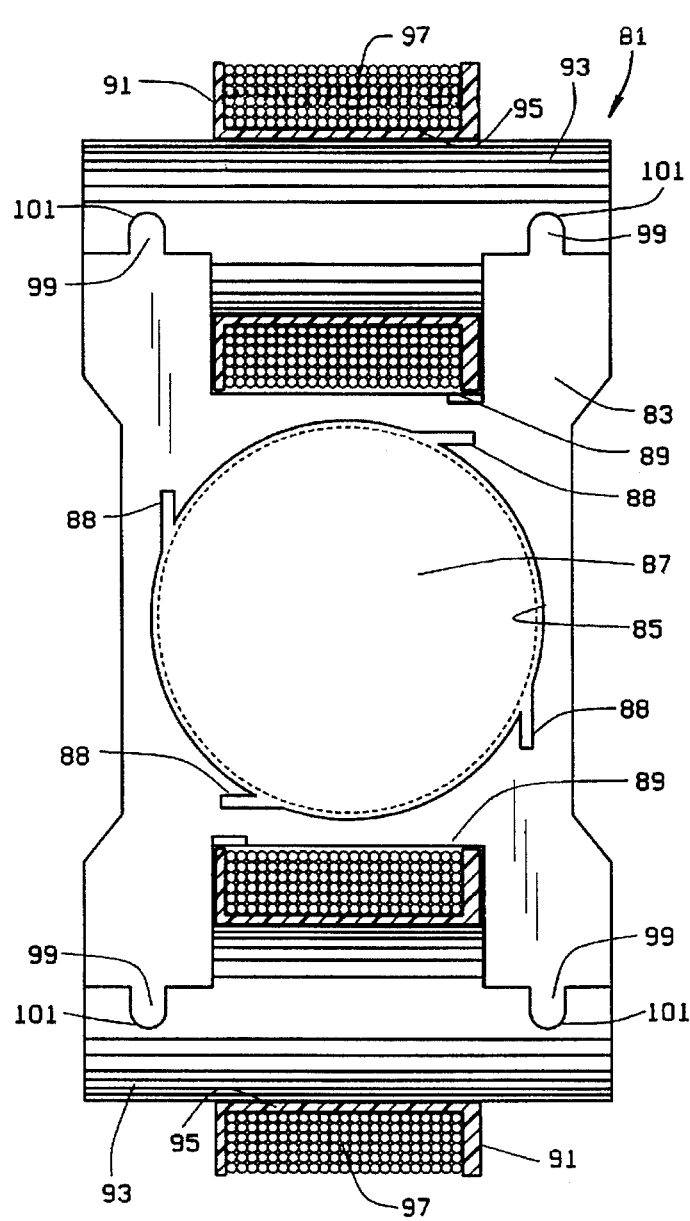
FIG. 16 is a side elevational view of a four pole motor employing the stacked stator laminations and stacked coil winding laminations of the type illustrated in the die layout of FIG. 15.
Figure 17:
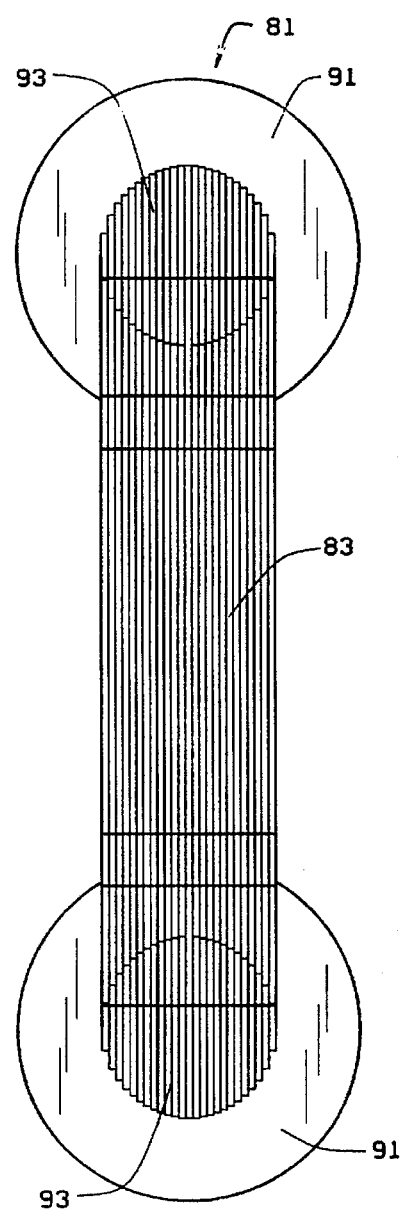
FIG. 17 is an end elevational view of the four pole motor shown in FIG. 16 of the drawings.

Reference is now made to the FIG. 15 manufacturing method and apparatus for forming the four pole motor shown in FIGS. 16–17 of the drawings. The motor 81 shown in FIGS. 16–17 of the drawings includes a series of stacked stator laminations 83, formed as illustrated, with a rotor opening 85 for receiving a rotor 87 that rotates with respect to a series of poles formed in the stator laminations 83 adjacent the rotor opening 85. The four slots 88 are for insertion of shading copper in the four pole motor illustrated in FIG. 16. The motor 81 includes a pair of U-shaped openings 89, 89 at opposite ends thereof for receiving the bobbins 91, 91 that are mounted on the stacked coil winding laminations 93, 93, each of which collectively have a combined generally circular outer cross sectional shape, as illustrated in FIG. 17, for receiving the center wall 95 of each bobbin 91. Wound about the insulating bobbin 91 is the electrically conductive wire 97 that is layer wound in closely packed relationship in a series of superimposed rows, as described in my aforementioned copending patent applications. The opposite ends of each of the stator laminations 83 include spaced male bosses 99, 99 for complementary cooperative fastening interconnection relative to spaced female openings 101, 101 at each end of the motor 81, as best seen in FIG. 15 of the drawings. Thus, the motor 81 is similar in certain respects to the C-frame motors illustrated in FIGS. 10A–10D and FIGS. 13A–13D, except that there are spaced and stacked coil winding laminations 93 attached to opposite ends of the stacked stator laminations 83, each of the stacked coil winding laminations 93 receiving a bobbin with an electrically wound coil 97. Further details of the motor 81 are shown in copending patent application Ser. No. 08/381,188 filed Jan. 31, 1995 entitled TWIN BOBBIN FOUR POLE MOTORS AND METHODS FOR MAKING SAME. Of course, stacked one-piece laminations with spaced coil winding windows can each receive split insulating bobbins about which an electrically conductive wire can be wound, if desired to be formed in this way.

For the manufacture of the four pole motor illustrated in FIGS. 16–17 of the drawings, reference is made to FIG. 15 which shows an elongated strip of magnetically conductive coil stock material 103 that is indexed through various work stations for progressively stamping various configurations in the coil stock 103, in a manner similar to the method described in connection with FIGS. 3–10 or 11–13 of the drawings. With respect to the FIG. 15 method, the coil stock 103 is initially stamped or punched with the rotor opening 85, resulting in the rotor slug or lamination 87 that forms the rotor 87 when a series of corresponding slugs or laminations are stacked together. Spaced notches 109L, 109L to the left and 109R, 109R to the right of the coil stock 103 are formed in alignment with pointed triangular ends of the rectangular slot with triangular ends 105 that is punched in the coil stock 103 to thus define each stator lamination 83 to be formed. Scrap 111L, 111R comes from the notches 109L, 109R while scrap piece 107 comes from the rectangular slot with triangular ends 105.

The next step in the progressive stamping or punching system includes movement by the movable die D9, which is moved to the right as shown by right arrow R. This movement to the right is produced by a controller and die locator which operates the drive motor M9 for forming a trapezoidal opening 110R, producing trapezoidal scrap piece 112R. The right side of the trapezoidal opening 110R forms the left side 93RL of the coil winding lamination 93R. At the same time, the wide notch 114L is formed on the left side of the lamination 83 which forms the left side 93LL for the left coil winding lamination 93L. Notch section 116L is produced during the forming of wide notch 114L.

The next movable die section D10 is moved by the controller and die locator to operate drive motor D10 to move the die section D10 to the left, as shown by the left arrow L, causing the wide notch 114R to be formed to the right side of the lamination 83, which forms the right side of the lamination 83, which forms the right side 93RR of the coil winding lamination 93R. The wide notch 114R produces the scrap notch section 116R to the right side of the coil stock 103, as shown. At the same time, a trapezoidal opening 110L is formed in the left side of the lamination 83, the longer side of the trapezoid which forms the right side 93LR of the left coil winding lamination 93L.

The next die section blanks out the right and left coil winding laminations 93R, 93L, respectively, as well as blanking out the three sides of the U-shaped opening 89 on the left and right sides of the U-shaped opening 89 on the left and right sides of the lamination 83.

Reference is made to FIGS. 6–9 for the various methods that may be employed in producing the coil winding laminations 93R, 93L and the scrap sections 118R, 118L. As will be appreciated, either one of the methods shown in FIGS. 6–7 and 8–9 may be employed, as desired.

In the forming of the right coil winding laminations 93R, spaced openings 101R, 101R are formed in the right coil winding laminations 93R while corresponding male bosses 99R, 99R are formed in the right side of the lamination 83. Similarly, spaced openings 101L, 101L are formed in the left coil winding lamination 93L with corresponding bosses 99L, 99L formed in the left side of lamination 83.

Each controller operated drive motor M9, M10 is programmed to produce the coil winding laminations 93 with predetermined incrementally varying widths such that when stacked, the combined configuration of the stacked coil winding laminations 93 have a generally circular outer cross section shape, at least along opposed sections thereof, as illustrated in FIGS. 16-17 of the drawings. Following the stacking of the stator laminations 83 and the coil winding laminations 93 as described above and the assembly of same relative to the insulating bobbin 91 with wound electrically conductive coil 97 on each of the stacked coil winding laminations 93, 93 at opposite ends of the stacked stator laminations 83, the four pole motor 81 results.

In each of the methods and apparatus described in connection with FIGS. 3-9, 11-12 and 15 of the drawings, the stamping or punching dies are moved transversely relative to the elongated strip. In the discussion that follows with respect to FIGS. 16-34 of the drawings, it will be seen that punching or stamping dies can be moved not only transversely relative to the elongated strip, but also longitudinally relative to the strip as well as in rotary paths relative to the strip, depending on the construction of the motor desired to be manufactured. It is to be understood that the punching dies can be moved in any direction in linear and/or curvilinear paths relative to the step. This can be achieved by using one or more movable dies in combination with one another. For example, a rotary die could be mounted on top of a transversely movable section for a predetermined compound movement in a part linear and part curvilinear path or in any other path desired.

Figures 22, 23, 24:
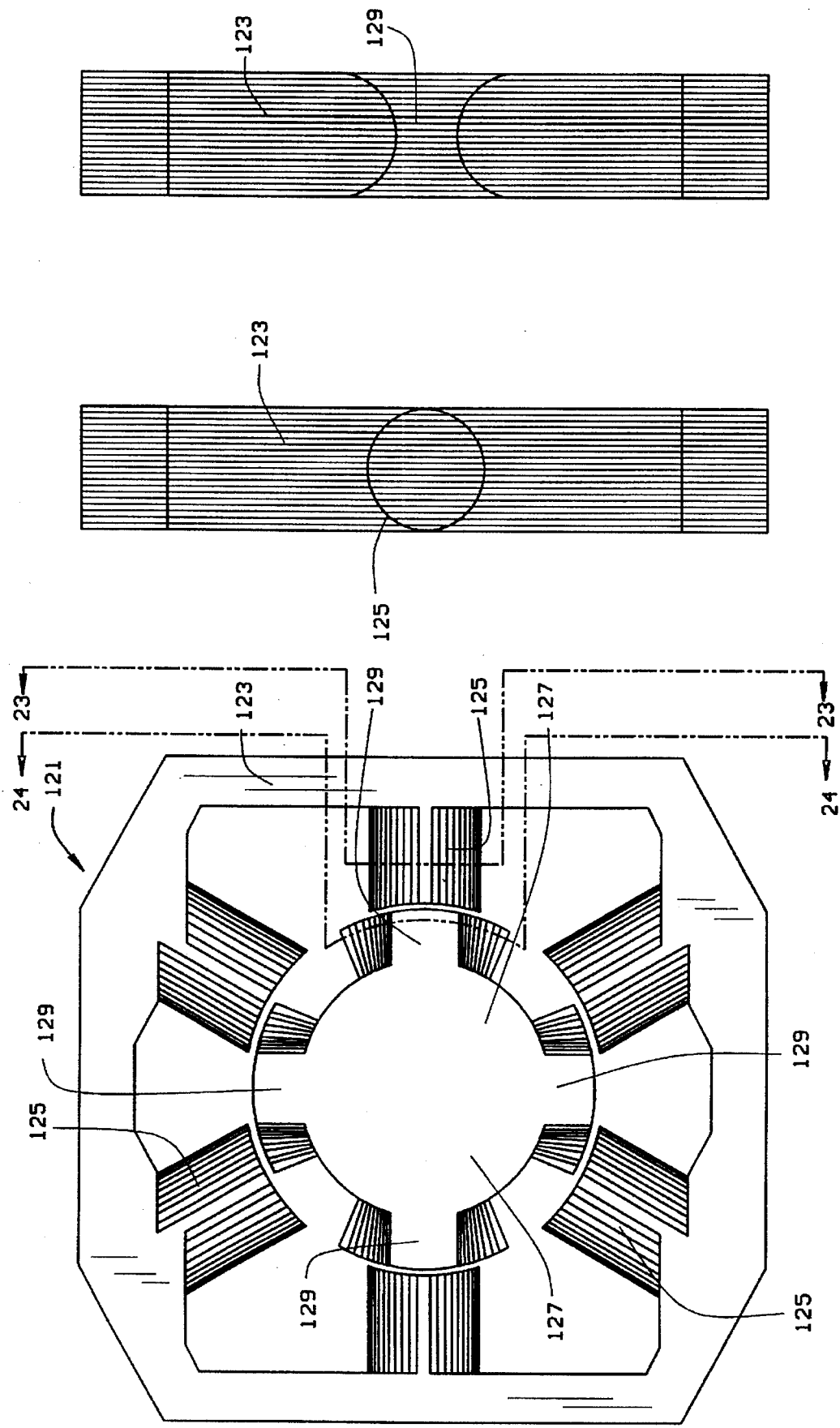
FIG. 22 is a side elevational view illustrating the construction of the stator and rotor poles in the six/four pole variable reluctance motor formed in the FIGS. 18–21 die layout.
FIG. 23 is a sectional view of the six/four pole variable reluctance motor shown in FIG. 21 of the drawings of the stacked stator lamination as viewed along line 23—23 of FIG. 22.
FIG. 24 is a sectional view illustrating the construction of the stacked rotor and stator laminations used in the variable reluctance motor shown in FIG. 19 of the drawings, as viewed along line 24—24 of FIG. 22.

FIGS. 18-21 disclose the method and apparatus for forming the variable reluctance motor illustrated in FIGS. 22-24 of the drawings. The variable reluctance motor 121 shown in FIGS. 22-24 of the drawings is a multi-pole stator and rotor motor. The stacked stator laminations 123 form a series of inwardly directed poles 125 spaced around a rotor 127 also provided with a series of spaced poles 129. Each stator pole 125 has spaced stator pole side sections on opposite sides of an inwardly curved stator pole face section. Each rotor pole 129 has spaced rotor pole side sections on opposite sides of an outwardly curved rotor pole face section. In the FIGS. 22-24 illustrated embodiment, there are six stator poles 125 and four rotor poles 129. As will be appreciated, each of the inwardly directed stator poles 125 are formed by a series of stacked laminations 123 having predetermined incrementally varying widths forming each lamination 123 to form a combined configuration of the stacked stator laminations 123 that results in a combined generally circular outer cross sectional configuration of generally circular shape at least along opposed spaced sections thereof, as illustrated in FIG. 23 of the drawings. The top plan view of FIG. 22 illustrates approximately one-half of the rotor 127 and the four spaced poles 129, in order to show the predetermined incrementally varying widths of the poles 129 when a series of rotor laminations 127 are stacked upon one another to form the rotor 127. The actual cross sectional configuration of each pole 129 is illustrated in FIG. 24 of the drawings; however, in order to understand the manner in which each of the poles 129 of the rotor 127 are constructed, as seen in the top plan view of FIG. 22, only one-half of the rotor 127 and associated poles 129 are shown. For a more detailed discussion and specific description of variable reluctance motors, reference is made to my aforementioned copending patent application Ser. No. 08/173,095 filed Dec. 27, 1993 entitled VARIABLE RELUCTANCE MOTOR.

The method and apparatus for forming the variable reluctance motor 121 shown in FIGS. 22-24 can best be understood by reference to FIGS. 18-21 of the drawings. As will be seen in describing the method and apparatus associated with FIGS. 18-21 of the drawings, rotary stamping dies, longitudinal stamping dies and transverse stamping dies are utilized for forming rotor laminations 127 and the stator laminations 123. Rotary stamping dies are first utilized to form the rotor laminations 127 followed by longitudinal stamping dies and transverse stamping dies in forming the stator laminations 123.

The coil stock 133 is first punched at the punching station 135 with a series of four spaced rounded trapezoidal shaped slots 137, as best seen in FIGS. 20-21 of the drawings. The coil stock 133 is then fed to a pair of adjacent rotary stamping dies 139, 141 which enlarged the rounded trapezoidal shaped slots 137, first to the left and then to the right, as best understood by comparing FIG. 18 with the enlarged diagrammatic illustration shown in FIG. 21. As the rotary stamping die 139 rotates to the left, it is then moved relative to the coil stock 133 for forming enlarged portions 137L in each of the rounded trapezoidal shaped openings 137. The coil stock 133 is next indexed to the rotary stamping station 141 where the rotary stamping dies 141 are rotated to the right for forming the enlarged portions 137R in each of the trapezoidal shaped rounded openings 137 that have already been enlarged by the rotary stamping dies 139 on the left with enlarged portions 137L. The rotary stamping dies 139, 141 are programmed to rotate in predetermined incrementally varying arcs to form the shape of the rotor poles 129 previously discussed when a series of rotor laminations 127 are stacked relative to one another.

In the next progressive stamping or punching station 143, the rotor lamination 127 is punched from the coil stock 133, and at the same time, notches 145 are formed in opposite edges of the coil stock 133 resulting in scrap sections 147, 147 on opposite sides of the coil stock 133. The area within the confines of each pair of spaced notches 145, 145 on opposite edges of the coil stock define the stator lamination 123 which is also provided with an initially formed rotor opening 149, once the rotor lamination 127 is punched from the coil stock.

At the next two progressive die stations, longitudinally movable stamping dies 151, 153 are provided and are driven by any suitable means such as controller operated stepper motors for moving the dies 151, 153 in opposite longitudinal directions relative to the coil stock 133. The longitudinally movable stamping die 151 is moved to the right away from the rotary stamping stations 139, 141 for forming intersecting slots 155, 155 which intersect the rotor opening 149. The next longitudinally movable die 153, which moves longitudinally toward the rotary stamping dies 139, 141, forms a second pair of slots 157, 157 which also intersect the rotor opening 149 on an opposite side thereof from the spaced slots 155, 155. As will be seen, both pairs of slots 155, 155 and 157, 157 extend generally transversely to the outer free edges of each stator lamination 123 to be formed.

The next progressive stamping station 159 forms a vertical punching or stamping operation solely. Specifically, station 159 forms a longitudinally directed slot 158 that intersects the transversely extending slot 155 on each side of the rotor opening 149 as well as a longitudinally extending slot 161 that intersects the transversely extending slot 157 on each side of the rotor opening 149, thus resulting in opposed mirror image L-shaped slots 155, 158 and 155, 158 on the left side of the rotor opening 149 and mirror image L-shaped slots 157, 161 and 157, 161 on the right side of the rotor opening, as best illustrated in FIGS. 20 of the drawings. In addition, a pair of spaced mirror image axe-head shaped openings 163, 163 are formed so as to also intersect the rotor opening 149 in equally spaced relationship to each of the mirror image L-shaped openings on each side of the rotor opening 149.

The next step in the progressive stamping process or system includes shifting of the movable die set 165 to the left of the coil strip followed by shifting of the movable die set 167 to the right of the coil strip. The movable die set 165 moves transversely relative to the coil stock 133 and forms the previously formed L-shaped openings 155, 158 and 157, 161 on the left side of the coil stock into the fan blade shaped openings 169, 169 while the axe-head shaped openings 163, 163 are enlarged along the lower extent thereof. Subsequently, the transversely movable die set 167 moves to the right of the L-shaped openings 155, 158 and 157, 161 into the spaced fan blade openings 171, 171. At the same time, the spaced axe-head shaped openings 163, 163 are enlarged at an upper end thereof into the configuration best illustrated in FIG. 20 of the drawings.

The last step in the process is the separation of each individual lamination 123 from the coil stock at the vertical punching or stamping station 173 to result in the individual laminations 123.

As will be appreciated, the longitudinally movable die sets 151, 153 and the transversely movable die sets 165, 167 are programmed to stamp or punch predetermined incrementally varying widths in the various openings discussed above, in order that the stator laminations 123, when stacked, produce combined generally circular outer cross sectional shaped spaced stator poles 125, as best seen in FIGS. 22–23 of the drawings, in a manner similar to the previously discussed motor constructions as well as my prior copending patent applications. Thus, it will be seen that the method and apparatus of FIGS. 18–21 forms the variable reluctance motor shown in FIGS. 22–24 through the use of rotary stamping dies, longitudinally movable stamping dies, and transversely movable stamping dies, all as discussed above.

Figure 26:
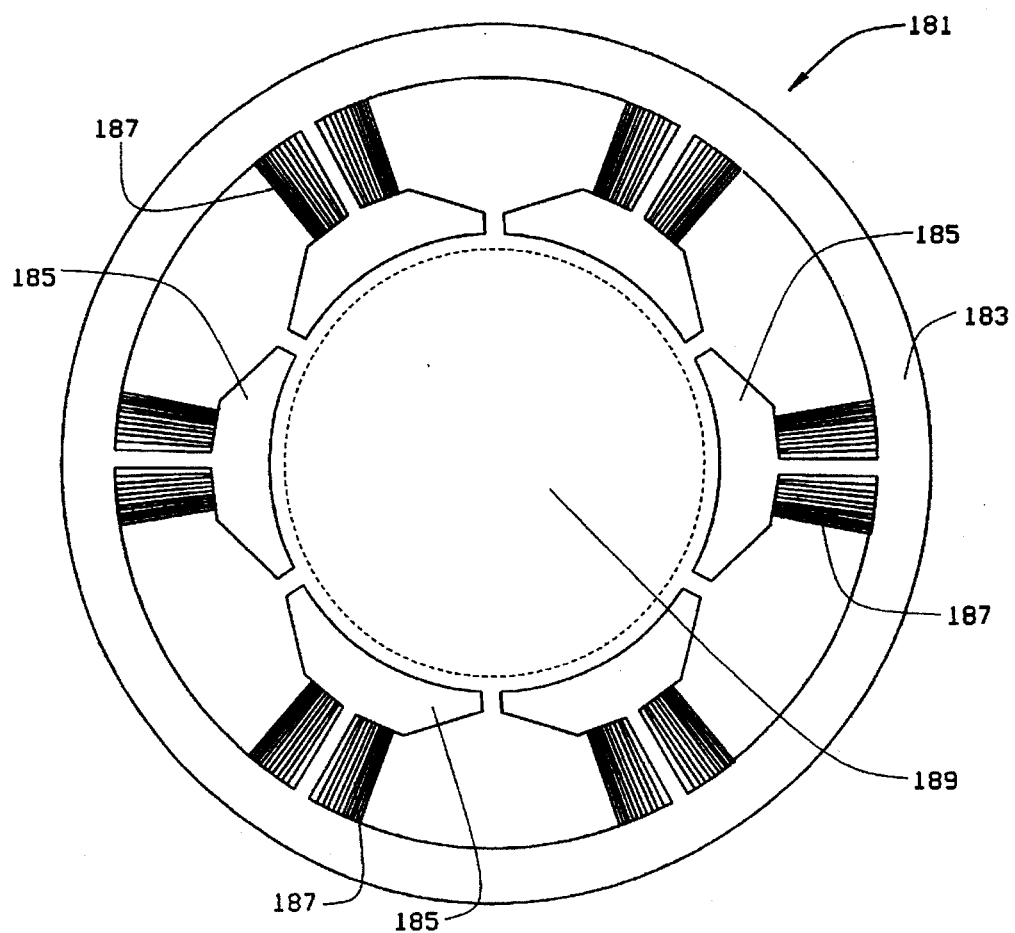
FIG. 26 is an enlarged side elevational view illustrating a stator construction with poles having coil winding areas of generally circular outer cross sectional shapes.

The method and apparatus of FIG. 25 is useful for forming the six pole motor illustrated in FIG. 26. Additionally, a similar method may be employed for manufacturing the variable reluctance motor examples shown in FIGS. 27 and 28 of the drawings.

The six pole motor 181 shown in FIG. 26 includes a stator lamination 183 having a series of semi-cylindrical pole faces 185 and associated coil winding areas 187 which are constructed to include the combined generally circular outer cross sectional shape when a series of stacked stator laminations 183 are stacked together. The rotor 189 is positioned within the confines of the semi-cylindrical pole faces 185 as shown in FIG. 25.

The variable reluctance motor 191 shown in FIG. 27 has a construction similar to the six pole motor 181 shown in FIG. 25 with the exception that there are a pair of spaced poles 195, 195 associated with each coil winding area 197 and the rotor has a series of spaced poles 199 moving within the confines of the spaced pairs of poles 195, 195 of the stacked stator laminations 193. Note that there are twelve stator poles 195 and ten rotor poles 199 to provide the multi-pole rotor/stator or variable reluctance motor illustrated in FIG. 27. FIG. 28 shows another form of variable reluctance motor 201 having a series of stacked laminations 203 with six poles 205 associated with each coil winding area 207. Since there are six coil winding areas 207, there are a total of 36 stator poles 205. The rotor has 38 rotor poles 209 rotating within the stator poles 205 in the construction illustrated. Other examples of variable reluctance motors are shown in my aforementioned copending patent application Ser. No. 08/173,095 filed Dec. 27, 1993 entitled VARIABLE RELUCTANCE MOTOR.

The six pole motor shown in FIG. 26 and the examples of variable reluctance motors shown in FIGS. 27 and 28 can be formed using rotary stamping dies such as that described in connection with FIG. 25 which refers specifically to the six pole motor construction shown in FIG. 26. Quite obviously, variations in the shape of the dies would be required for manufacturing the variable reluctance motor shown in FIGS. 27 and FIG. 28; however, the same essential procedural steps and apparatus would be employed.

In FIG. 25, the coil stock 213 is punched or stamped at the first progressive die station 215 to form the general configuration of the stator lamination 183 with the stator lamination and rotor 189 still integrally connected to one another, as illustrated. The next two progressive die stations 217 and 219 utilize rotary stamping dies, such as described in connection with FIGS. 18–21, for stamping the coil winding areas 187, first to the right, as shown in rotary die station 217 and then to the left as shown in rotary die station 219. This will produce a series of coil winding area 187 with predetermined incrementally varying widths to provide the generally circular outer cross sectional shape for the combined and stacked coil winding area 187, as illustrated in FIG. 26 of the drawings. Finally, at vertical die stamping or punching station 221, the stator 183 is stamped from the coil stock 213 along with the rotor 189 which is separated from the poles 185 of the stator lamination 183, in order to provide separate stator laminations 183 and rotor laminations 189 for stacking together to form the stacked motor stator laminations 183 and rotor 189, as illustrated in FIG. 26 of the drawings.

Similar method and apparatus would be employed for manufacturing the variable reluctance motors shown in FIGS. 27 and 28 of the drawings, with the exception that the stamping dies would be different for the spaced poles 195, 195 associated with each coil winding area 197 and the rotor poles 199 in the FIG. 27 embodiment, as well as different stator pole 205 and rotor poles 209 in the FIG. 28 embodiment.

It will be appreciated that in each of the constructions illustrated in FIGS. 26, 27 and 28 of the drawings, a winding coil would be wound about the winding area either directly on the coil winding area or wound about a split insulating bobbin that is first assembled on each coil winding area in the same manner as described above and in my prior, copending patent applications, as indicated.

Figure 30:
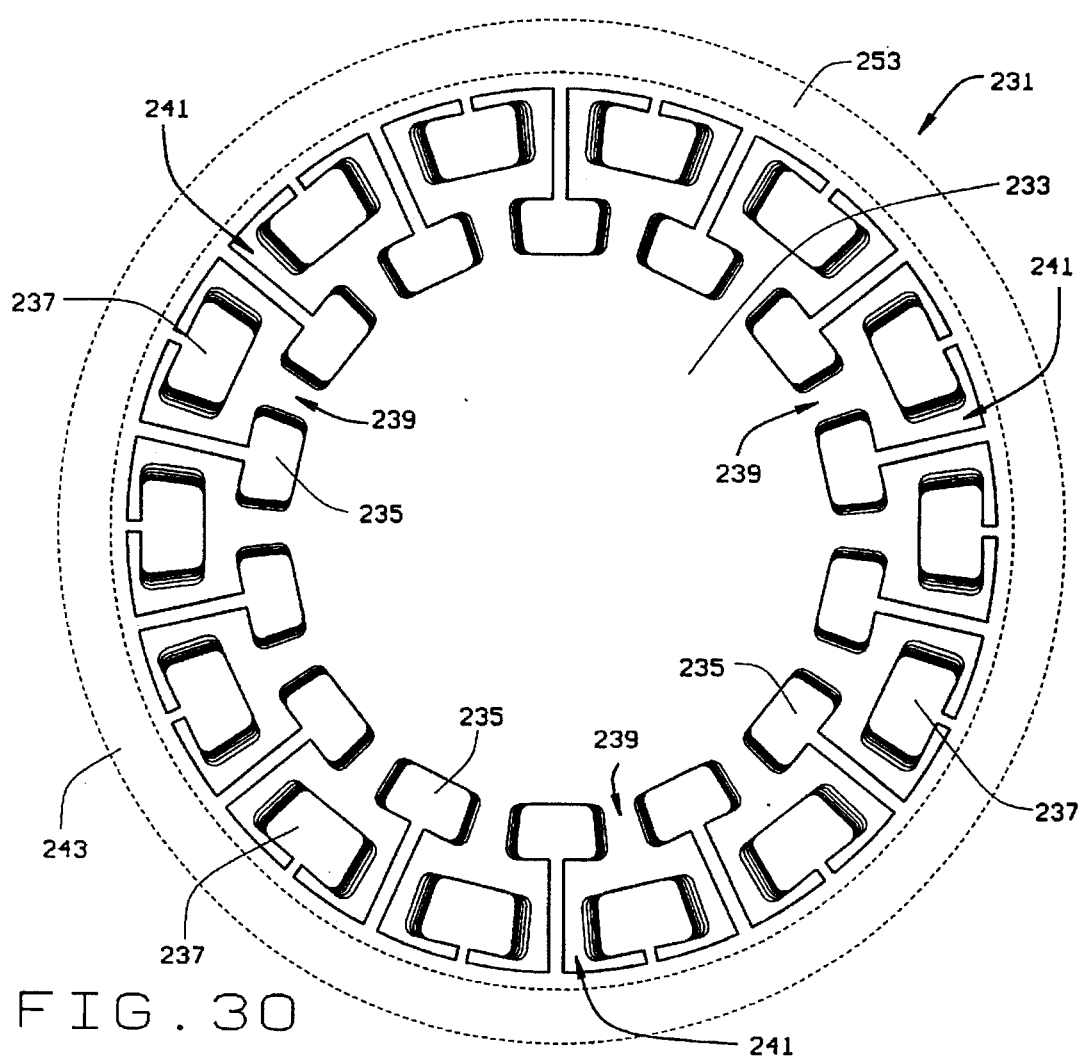
FIG. 30 illustrates a top plan view of the inside-out stator lamination construction for an inside-out motor where the coil winding area or segments are formed with a generally circular outer cross sectional shape.

Attention is now directed to the method shown in FIG. 29 for forming the inside-out motor illustrated in FIG. 30 of the drawings. The inside-out motor 231 includes a stator plate 233 having an inner circumferential series of spaced winding windows or openings 235 surrounded by an outer circumferential series of winding windows or openings 237. Between adjacent winding windows 235 in the inner circumferential series are coil winding segments 239, while coil winding segments 241 are located between adjacent winding windows 237 in the outer circumferential series. It will be appreciated that an electrically conductive wire is typically wound directly about the coil winding segments 239 in the inner circumferential series and coil winding segments 241 in the outer circumferential series.

The method and apparatus for forming the inside-out motor 231 shown in FIG. 30 is illustrated in FIG. 29 of the drawings. Coil stock 243 is fed to a first vertical stamping or die punching station which punches the spaced winding windows 235 and 237, respectively. The next two die stations are rotary stamping or punching dies 247 and 249 which first stamp an enlarged winding windows 235, 237 on the right, and then on the left, as illustrated. This will provide a circumferential series of inner coil winding segments 239 and an outer circumferential series of coil winding segments 241 with predetermined incrementally varying widths in order to provide a generally circular outer cross sectional shape at least along opposed spaced sections thereof for winding electrically conductive wire directly on the coil winding segments in a manner similar to the previous embodiments. Finally, in die stamping station 259, the stator plate 233 is stamped from the coil stock along with an outer rotor ring 253, shown in dotted lines in both FIGS. 27 and 28 of the drawings. The outer rotor ring 253 is designed to rotate relative to the stator plate 233, in a manner well known in the art.

Figure 31:
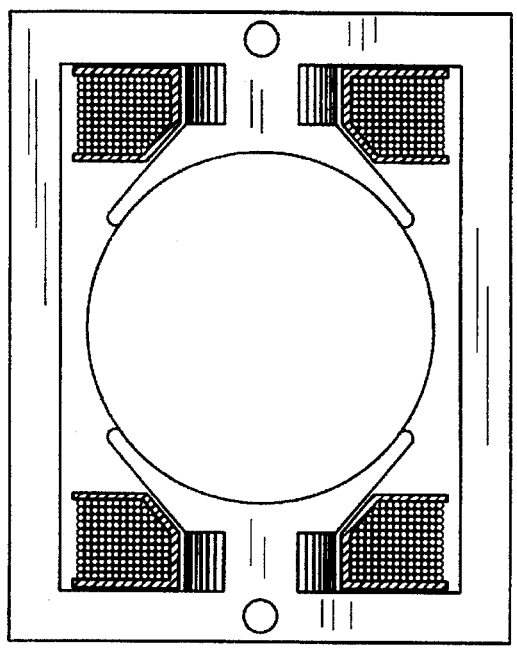
FIG. 31 is a side elevational view of one type of universal motor that can be constructed by the method and apparatus of the present invention.
Figure 32:
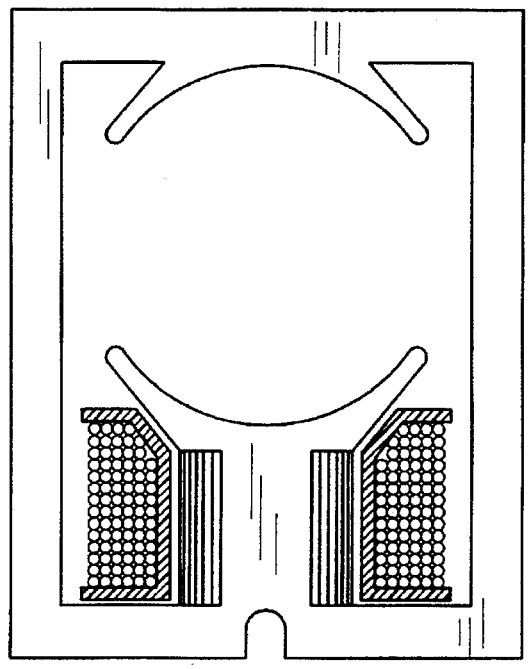
FIG. 32 is a side elevational view of another type of universal motor that can be constructed by the method and apparatus of the present invention.

It will be understood that certain motors can be formed simply by the use of forming elements or dies that are incrementally moved predetermined amounts in a linear path by controller operated drive motors to form a series of laminations that are identical in shape except for coil winding areas. In those coil winding areas, adjacent laminations vary in order to provide coil winding areas of generally circular outer cross sectional configuration at least along spaced opposed sections thereof. For example, the two types of universal motors shown in FIG. 31 and FIG. 32 are produced in this way. The specific construction of the FIG. 31 and FIG. 32 motors, as well as the difference between adjacent laminations in the forming process, are described in greater detail in the aforementioned copending U.S. Ser. No. 08/129,336 filed Sep. 30, 1993 entitled METHOD FOR MANUFACTURING IMPROVED ELECTRO-MAGNETIC INDUCTION DEVICES.

Figure 33:
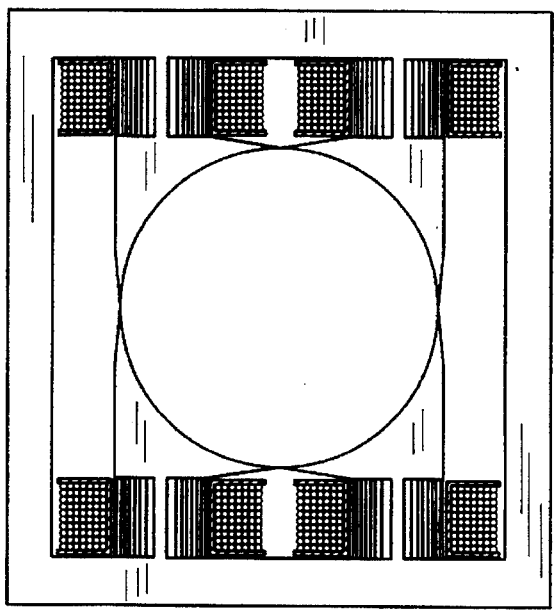
FIG. 33 is a side elevational view of another type of four pole motor that can be constructed by the method and apparatus of the present invention.
Figure 34:
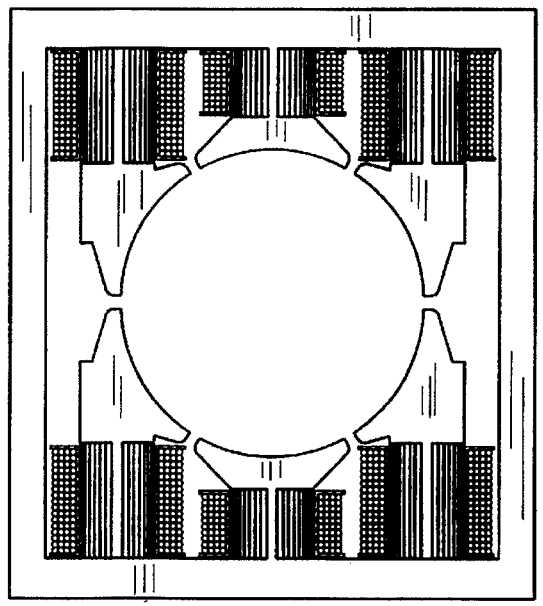
FIG. 34 is a side elevational view of another type of six pole motor that can be constructed by the method and apparatus of the present invention.
Figure 35:
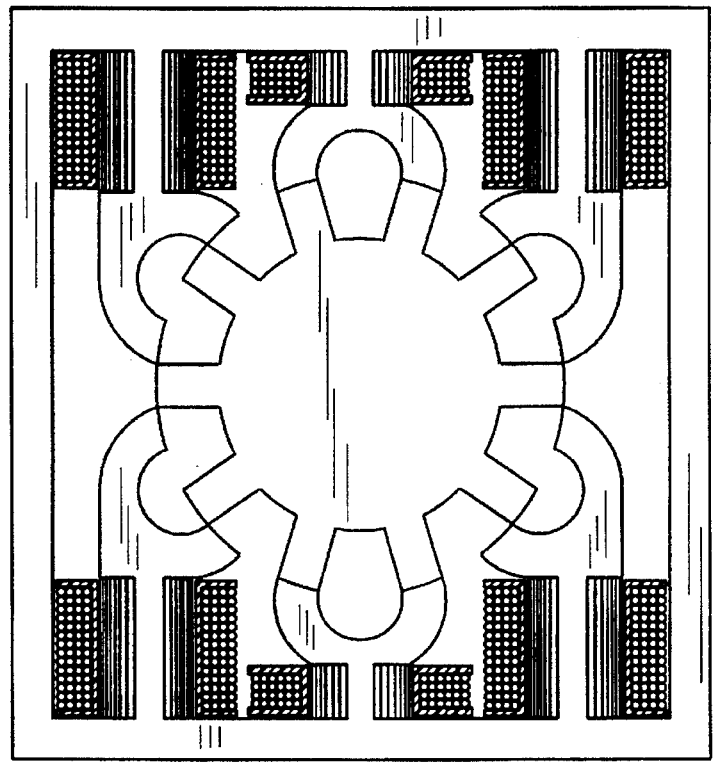
FIG. 35 is a side elevational view of another type of ten pole rotor/twelve pole stator variable reluctance motor that can be constructed by the method and apparatus of the present invention.
Figure 36:
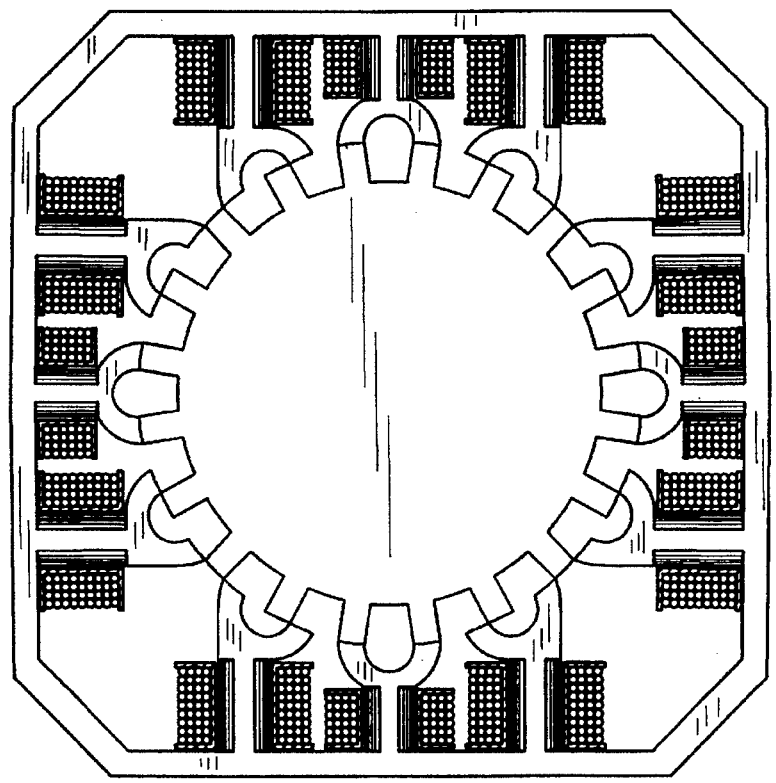
FIG. 36 is a side elevational view of another type of twenty pole rotor/twenty-four pole stator variable reluctance motor that can be constructed by the method and apparatus of the present invention.

In the same way, the four pole motor shown in FIG. 33 and the six pole motor shown in FIG. 34 are similarly formed. Also, the variable reluctance motors illustrated in FIG. 35 and FIG. 36 can be formed in the similar manner. The construction and the method of manufacture of the FIGS. 35 and 36 variable reluctance motors can be further understood by the reference to aforementioned copending U.S. Ser. No. 08/173,095 filed Dec. 27, 1993 entitled VARIABLE RELUCTANCE MOTOR.

The above examples are simply representative of various other types and kinds of motors that can be manufactured by the method and apparatus of the present invention. In addition to the motor examples specifically disclosed in this application as well as the aforementioned copending patent applications, it will be appreciated that other types and kinds of motors, as well as transformers and inductors, can be produced by the apparatus and method of the present invention, as shown in my aforementioned copending patent application Ser. No. 08/129,336 filed Sep. 30, 1993 entitled METHOD FOR MANUFACTURING IMPROVED ELECTRO-MAGNETIC INDUCTION DEVICES.

Further, the previously discussed embodiments have referred to controllers as including computer or program logic controller or other electronically controlled devices as examples of controllers for controlling the desired movement of the transverse or longitudinally moving dies or rotary moving dies relative to an elongated strip. Other types of electrically controlled devices are, of course, possible, as will be apparent.

From the foregoing, it will now be appreciated that the present invention has disclosed a unique controlled adjustable manufacturing method and apparatus in which predetermined incrementally varying widths used in coil winding segments of laminations for electro-magnetic induction devices are formed by moving punching or stamping dies relative to magnetically conductive material. When the punching or stamping dies are moved relative to magnetically conductive material, they can be moved in any direction in any linear and/or curvilinear path. For example, they can be generally transversely, generally longitudinally, in a rotary fashion or in any other predetermined format relative to the magnetically conductive material to produce the desired lamination construction. The novel method and apparatus thus provides continuous operation and automation in the forming and subsequent stacking, counting and/or staking of variable laminations which can also be readily adapted to current manufacturing techniques, as well as current electro-magnetic induction device constructions, without requiring substantial modifications or changes.

In view of the above, it will be seen that the several objects and features of this invention are achieved and other advantageous results obtained.

As various changes could be made in the above construction and methods without departing from the scope of the invention, it is intended that all matter contained in the above description or shown in the accompanying drawings shall be interpreted as illustrative and not in a limiting sense.

I claim:

1. A method of forming laminations in an electro-magnetic induction device, including the steps of:
    measuring the thickness of a strip of magnetically conductive material;
    forming a predetermined number of laminations from an elongated strip of magnetically conductive material;
    variable adjustable forming of opposite edge portions of at least one coil winding segment of predetermined incrementally varying width in each lamination during the forming of said laminations through independently operating forming elements which are electrically controlled by automatically variable and adjustable electrically synchronized movement relative to one another and to said elongated strip of magnetically conductive material based on the measured thickness of the strip of magnetically conductive material; and
    stacking said laminations with the coil winding segments of said laminations arranged to form a combined predetermined outer winding area about which a predetermined length of electrically conductive wire can be positioned.

2. The method as defined in claim 1 wherein the independently operating forming elements are moved generally transversely relative to said elongated strip.

3. The method as defined in claim 1 wherein the independently operating forming elements are moved generally longitudinally relative to said elongated strip.

4. The method as defined in claim 1 wherein the independently operating forming elements are moved in predetermined rotary paths relative to said elongated strip.

5. The method as defined in claim 1 wherein the independently operating forming elements are moved in a predetermined linear path relative to said elongated strip.

6. The method as defined in claim 1 wherein the independently operating forming elements are moved in a predetermined curvilinear path.

7. The method as defined in claim 1 wherein the independently operating forming elements are moved in predetermined linear and curvilinear paths.

8. A method of manufacturing a plurality of laminations for an electro-magnetic induction device, comprising the steps of:

forming a series of laminations from magnetically conductive material;

automatically variable and adjustable electrically synchronized mechanical forming of opposite edge portions of incrementally varying width in a selected area of each of a series of laminations formed from magnetically conductive material based on the total thickness of laminations in the electro-magnetic induction device in order to provide predetermined incrementally varying coil winding segments in adjacent laminations of said series;

stacking said series of laminations in a predetermined stacked sequence with the coil winding segments of predetermined incrementally varying width in adjacent laminations arranged to form a combined coil winding area of predetermined outer shape; and measuring the total thickness of laminations in the electro-magnetic induction device and transmitting that information for use in the automatically variable and adjustable electrically synchronized mechanical forming movements in the next electro-magnetic induction device.

9. A method of manufacturing a plurality of laminations for an electro-magnetic induction device, comprising the steps of:

feeding an elongated strip of magnetically conductive material along a predetermined path;

forming laminations of predetermined configuration from said elongated strip;

automatically variable and adjustable electrically synchronized mechanical forming of opposite edge portions of incrementally varying width in at least one selected area of each lamination formed from said elongated strip based on the total thickness of laminations in the electro-magnetic induction device in order to form predetermined incrementally varying coil winding segments in adjacent laminations;

stacking said laminations in a predetermined stacked sequence with the coil winding segments of predetermined incrementally varying width in adjacent laminations arranged to form a combined coil winding area of predetermined outer shape: and measuring the total thickness of laminations in the electro-magnetic induction device and transmitting that information for use in the automatically variable and adjustable electrically synchronized mechanical forming movement in the next electro-magnetic induction device.

10. A method of manufacturing a plurality of stacked laminations having at least one predetermined outer winding area about which an electrically conductive wire can be positioned to form an electro-magnetic inductive device, including the steps of:

forming said laminations from an elongated strip of magnetically conductive material;

measuring the thickness of at least a predetermined length of said elongated strip;

automatically variable and adjustable electrically synchronized mechanical forming of opposite edge portions of incrementally varying width in at least one selected area of each lamination based on the measured thickness of said elongated strip; and stacking said laminations in a predetermined sequence to form the at least one predetermined outer winding area.

11. The method as defined in claim 10 wherein the measuring occurs prior to the forming of said laminations.

12. The method as defined in claim 10 wherein the measuring occurs during the forming of said laminations.

13. The method as defined in claim 10 wherein the measuring occurs during the stacking of said laminations.

14. The method as defined in claim 10 wherein the measuring occurs after the stacking of said laminations.

15. A method of forming laminations for an electro-magnetic induction device, comprising the steps of:

feeding an elongated strip of magnetically conductive material along a predetermined path;

forming a series of laminations of predetermined configuration from said elongated strip;

automatically variable and adjustable electrically synchronized mechanical forming of coil winding segments of incrementally varying width in adjacent laminations based on the number and total thickness of the series of laminations forming the electro-magnetic induction device;

stacking said predetermined number of laminations in a predetermined stacked sequence with the coil winding segments of said laminations arranged to form a combined outer winding area of predetermined configuration;

stacking said stacked laminations to each other to form the electro-magnetic induction device;

measuring the total thickness of laminations in the electro-magnetic induction device; and transmitting the total thickness information for use during said variable electrically adjustable mechanical forming sequence in forming the combined outer cross sectional winding area in the next electro-magnetic induction device.

* * * * *